US011279835B2

(12) United States Patent
Andrés Martinez et al.

(10) Patent No.: US 11,279,835 B2
(45) Date of Patent: Mar. 22, 2022

(54) ANTIFOULING COATING COMPOSITION COMPRISING NOVEL CARBON-BASED HYDROLYSABLE POLYMERS

(71) Applicant: HEMPEL A/S, Kgs. Lyngby (DK)

(72) Inventors: Eduardo Andrés Martinez, Barcelona (ES); Craig Edward Wood, Burnley (GB); Nelida Gimeno Gormaz, Saragossa (ES)

(73) Assignee: HEMPEL A/S, Lyngby (DK)

( * ) Notice: Subject to any disclaimer, the term of this patent is extended or adjusted under 35 U.S.C. 154(b) by 354 days.

(21) Appl. No.: 16/348,688

(22) PCT Filed: Nov. 10, 2017

(86) PCT No.: PCT/DK2017/050370
§ 371 (c)(1),
(2) Date: May 9, 2019

(87) PCT Pub. No.: WO2018/086670
PCT Pub. Date: May 17, 2018

(65) Prior Publication Data
US 2021/0163758 A1 Jun. 3, 2021

(30) Foreign Application Priority Data
Nov. 11, 2016 (EP) .................................. 16198455

(51) Int. Cl.
| C09D 5/16 | (2006.01) |
| C08F 220/28 | (2006.01) |
| C08F 220/14 | (2006.01) |
| C08L 93/04 | (2006.01) |
| C08F 230/08 | (2006.01) |

(52) U.S. Cl.
CPC ............ *C09D 5/165* (2013.01); *C08F 220/14* (2013.01); *C08F 220/281* (2020.02); *C08L 93/04* (2013.01); *C09D 5/1637* (2013.01); *C09D 5/1668* (2013.01); *C08F 220/282* (2020.02); *C08F 220/283* (2020.02); *C08F 220/286* (2020.02); *C08F 230/085* (2020.02); *C08L 2205/03* (2013.01); *C08L 2207/53* (2013.01)

(58) Field of Classification Search
CPC ................................ C09D 5/1668; C09D 5/16
See application file for complete search history.

(56) References Cited

U.S. PATENT DOCUMENTS

| 3,607,821 | A | 9/1971 | Clarke et al. |
| 4,147,688 | A | 4/1979 | Makhlouf et al. |
| 4,401,797 | A | 8/1983 | Gallop |
| 4,493,914 | A | 1/1985 | Chattha |
| 4,772,666 | A | 9/1988 | Just et al. |
| 4,882,391 | A | 11/1989 | Brindöpke et al. |
| 4,960,828 | A | 10/1990 | Higuchi et al. |
| 5,045,602 | A | 9/1991 | Wamprecht et al. |
| 5,567,527 | A | 10/1996 | Webster et al. |
| 6,479,566 | B2 * | 11/2002 | Lines ................... C09D 5/1656 523/122 |
| 7,377,968 | B2 | 5/2008 | Reybuck et al. |
| 2003/0125470 | A1 | 7/2003 | Ohrbom et al. |
| 2012/0156417 | A1 * | 6/2012 | Pollino ............... D06M 15/277 428/96 |
| 2012/0251730 | A1 | 10/2012 | Brym et al. |
| 2014/0045966 | A1 | 2/2014 | Motofuji et al. |
| 2015/0329733 | A1 | 11/2015 | Pierre et al. |

FOREIGN PATENT DOCUMENTS

| EP | 0001088 A1 | 3/1979 |
| EP | 0204456 A1 | 12/1986 |
| EP | 0260958 A2 | 3/1988 |
| EP | 0297505 A2 | 1/1989 |
| EP | 0342276 A1 | 11/1989 |
| EP | 0471204 A2 | 2/1992 |
| EP | 0646630 A1 | 4/1995 |
| EP | 0737726 A1 | 10/1996 |
| EP | 0775733 A1 | 5/1997 |
| EP | 0779304 A1 | 6/1997 |
| EP | 0802243 A2 | 10/1997 |
| EP | 1006156 A1 | 6/2000 |
| EP | 1127925 A1 | 8/2001 |
| EP | 1138725 A1 | 10/2001 |
| EP | 1277816 A1 | 1/2003 |
| EP | 1342756 A1 | 9/2003 |
| EP | 1479737 A1 | 11/2004 |
| EP | 1584663 A1 | 10/2005 |
| GB | 2311070 A | 9/1997 |
| JP | 48-29551 B4 | 9/1973 |
| JP | 57-177068 A | 10/1982 |

(Continued)

OTHER PUBLICATIONS

Computer-generated English-language translation of JP-2016084446-A.*
Ash et al., "Handbook of paint and coating raw materials", Gower Publ. Ltd., Great Britain, vol. 1, 1996, pp. 821-823 and 849-851 (6 pages).
Camara et al., "Free radical polymerization study of glycerin carbonate methacrylate for the synthesis of cyclic carbonate functionalized polymers", European Polymer Journal, vol. 61, 2014, pp. 133-144 (12 pages).

(Continued)

*Primary Examiner* — Nu A Nguyen
(74) *Attorney, Agent, or Firm* — Birch, Stewart, Kolasch & Birch, LLP

(57) ABSTRACT

The present application describes novel antifouling coating compositions comprising carbon-based hydrolysable polymers of ethylenically unsaturated monomers of which some include cyclic carbonates or cyclic ethers, e.g. (2,2-dimethyl-1,3-dioxolan-4-yl)methyl (meth)acrylate (IPGA/IPGMA), isopropylidene glycerol ethoxylated acrylate (iPGEOA), isopropylidene glycerol ethoxylated methacrylate (iPGEOMA) and (2-oxo-1,3-dioxolan-4-yl)methyl (meth)acrylate (GCA/GCMA), and their use in antifouling coating compositions. Novel polymers are also described.

25 Claims, No Drawings

(56) References Cited

FOREIGN PATENT DOCUMENTS

| | | | |
|---|---|---|---|
| JP | 60-248897 A | | 12/1985 |
| JP | 64-16809 A | | 1/1989 |
| JP | 2016084446 A | * | 5/2016 |
| KR | 10-2014-0117986 A | | 10/2014 |
| WO | WO 97/44401 A1 | | 11/1997 |
| WO | WO 00/77102 A1 | | 12/2000 |
| WO | WO 03/027194 A2 | | 4/2003 |
| WO | WO 03/070832 A2 | | 8/2003 |
| WO | WO 03/080747 A1 | | 10/2003 |
| WO | WO 2004/018533 A1 | | 3/2004 |
| WO | WO 2005/005516 A1 | | 1/2005 |
| WO | WO 2009/007276 A1 | | 1/2009 |
| WO | WO 2009/149919 A1 | | 12/2009 |
| WO | WO 2012/083292 A1 | | 6/2012 |
| WO | WO 2012/130718 A1 | | 10/2012 |
| WO | WO 2013/000479 A1 | | 1/2013 |
| WO | WO 2014/010702 A1 | | 1/2014 |
| WO | WO 2015/114091 A1 | | 8/2015 |
| WO | WO 2016/066567 A1 | | 5/2016 |

OTHER PUBLICATIONS

Hild, "Formation et propriétés élastiques de réticulats radicalaires préparés àpartir d'esters méthacryliques*", Makromol. Chem., vol. 177, 1976, pp. 1947-1972 (27 pages), with an English summary.

Kiil et al., "Marine biofouling protection: design of controlled release antifouling paints", Chemical Product Design: Toward a Perspective through Case Studies, Chapter 7, 2007, pp. 181-238 (58 pages).

* cited by examiner

ANTIFOULING COATING COMPOSITION COMPRISING NOVEL CARBON-BASED HYDROLYSABLE POLYMERS

FIELD OF THE INVENTION

The present invention relates to antifouling coating compositions comprising carbon-based hydrolysable polymers of ethylenically unsaturated monomers of which some include cyclic carbonates or cyclic ethers, and their use in antifouling coating compositions.

BACKGROUND OF THE INVENTION

Underwater structures exposed to seawater are subjected to fouling by marine organisms such as green and brown algae, barnacles, mussels, tube worms and the like. Fouling is undesired on marine constructions such as vessels, oil platforms, buoys, etc. because it may lead to biological degradation of the surface, increased load and accelerated corrosion. On vessels the fouling will lead to increased drag resistance which will cause reduced speed and/or increased fuel consumption. It can also result in reduced manoeuvrability.

To prevent settlement and growth of marine organisms antifouling paints are used. These paints generally comprise a film-forming binder, together with different components such as pigments, fillers, solvents and/or biologically active substances.

One broad group of biocidal antifouling coatings on the market today is the self-polishing antifouling coatings. Long term antifouling performance and reliability of self-polishing coatings is ultimately based on the binder technology, where the polishing properties enable the surface erosion and/or solubilisation in a sufficient rate to follow the biocide leaching front, so that the leach layer, devoid of biocides, is kept constant at a reasonably thickness to guarantee effective biocide lixiviation and antifouling performance.

Traditional binder technologies such as rosin are known to develop thicker leach layers over time. Due to the inefficiency of these old technologies to polish actively and prevent the build-up of this leach layer, which imposes a growing diffusion barrier between the biocide lixiviation front and the surface, alternative types of antifouling coatings are needed, that can perform better and effectively protect the surface against fouling.

Modern antifouling coatings are based on (meth)acrylic co-polymers having pendant hydrolysable groups. In seawater the polymer is gradually hydrolysed. The remaining acrylic co-polymer, now containing carboxylic acid groups, becomes sufficiently soluble or dispersible in seawater to be washed out or eroded away from the coating surface. This self-polishing effect provides a controlled release of the biologically active compounds in the coating resulting in the excellent antifouling efficiency and smooth surfaces and hence reduced frictional resistance. Some self-polishing antifouling systems today are based on non-aqueous dispersion resins such as described in WO 03/027194 A2. Another group of self-polishing antifouling systems are based on silyl ester functional (meth)acrylic co-polymers. These coating compositions are for example described in EP 0 646 630, EP 1 342 756, EP 1 479 737, EP 1 641 862, WO 00/77102, WO 03/080747, WO 2009/007276 and WO 2009/149919. Another common group of self-polishing antifouling systems on the market today are based on metal carboxylate co-polymers. These coating compositions are for example described in EP 0 204 456, EP 0260 958, GB 2 311070, EP 0 779 304, EP 1 006 156 and EP 1138 725. Some technologies, such as non-aqueous dispersion technology and silyl acrylate technology, undergo by different means chemical reaction as an effect of their exposure to sea water. This hydrolysis reaction progressively switches solubility of these polymeric binders into a soluble form that is then solubilised and polished. The binder thus plays an active role in polishing and is capable of following the leaching front down through the film during service period. The leach layer is kept constantly thin and yields a longer period of effective fouling protection.

Antifouling coatings containing silyl ester co-polymers as binder are often modified by cobinders or other materials in order to adjust properties, such as film properties and polishing rates. The binder component as a whole imparts adhesion, binds the pigments together, and strongly influences such properties as flexibility and toughness.

The most commonly used modifier is rosin and its derivatives as described in EP-A-0802243. Other modifiers include monocarboxylic acid containing materials and their metal salts (EP-A-1342756), chlorinated paraffins (EP0775733), hydrophilic co-polymers comprising lactam or amide groups (EP1127925), metal carboxylate group containing polymers (EP-A-1277816), fibres (WO 00/77102) and incompatible polymers as described in WO 03/070832.

The above hydrolysable technologies have the disadvantages of a complex synthesis and high cost, high reactivity and poor in-can stability when not correctly formulated. The present inventors are seeking a cheap and convenient new binder which give rise to at least the same valuable properties but which can be made synthetically and hence readily on an industrial scale. The present invention discloses a carbon-based hydrolysable binder alternative, which captures the above benefits of a sustained and reliable long term performance in a more cost-effective and stable version.

EP 0 001 088 A1 discloses homo- and co-polymers of e.g. 2-oxo-1,3-dioxolan-4-yl)methyl (meth)acrylate (GCA/GCMA). Co-polymers of the monomers with acrylate esters are mentioned as being soluble, high-molecular and miscible with pigments and useful as lacquers. It is mentioned that the moieties are very reactive and may undergo chemical reactions.

US 2012/0251730 A1 discloses two-component coating composition wherein one component comprises a co-polymer having a reactive cyclic carbonate groups (e.g. 2-oxo-1,3-dioxolan-4-yl)methyl (meth)acrylate (GCA/GCMA)) and the other component has at least one diamine or polyamine. Curing is obtained by reaction between the cyclic carbonate group and the diamine or polyamine. The coating compositions are described as useful for a number of application where a robust coating is desirable.

EP 737 726 A1 discloses a one-component thermosetting resin for use as a coating. The composition for forming the resin may comprise a component comprising a five-membered cyclic carbonate compound, e.g. 2-oxo-1,3-dioxolan-4-yl)methyl (meth)acrylate (GCA/GCMA).

U.S. Pat. No. 4,772,666 discloses a curable mixture comprising a co-polymer comprising monomers containing 1,3-dioxolan-2-one groups, e.g. 2-oxo-1,3-dioxolan-4-yl)methyl (meth)acrylate (GCA/GCMA). The co-polymers are to undergo reaction with polyisocyanates or aminoplast resins.

U.S. Pat. No. 5,567,527 discloses co-polymers containing 1,3-dioxolan-2-one groups, e.g. 2-oxo-1,3-dioxolan-4-yl)

methyl (meth)acrylate (GCA/GCMA), which may be cured with primary amine cross-linking compounds to form a polyurethane coating.

US 2015/0329733 A1 discloses a polymer comprising ethylenically unsaturated monomers carrying a cyclic carbonate group, e.g. 2-oxo-1,3-dioxolan-4-yl)methyl (meth) acrylate (GCA/GCMA), which are curable by polyamine.

U.S. Pat. No. 4,401,797 discloses a co-polymers comprising (2,2-dimethyl-1,3-dioxolan-4-yl)methyl methacrylate (IPGMA) or 2-oxo-1,3-dioxolan-4-yl)methyl (meth)acrylate (GCA/GCMA) and a second acrylate e.g. methyl methacrylate for the production of contact lenses.

US 2003/125470 A1 discloses a curable coating composition comprising acrylic polymers prepared from ethylenically unsaturated monomers carrying a cyclic carbonate group, e.g. 2-oxo-1,3-dioxolan-4-yl)methyl methacrylate (GCMA) and other acrylates.

WO 2012/083292 discloses a stain resistant, oil and water repellent composition comprising a copolymer of fluorinated methacrylate, carbonate methacrylate and methacrylic acid or salt thereof.

FATOUMATA CAMARA ET AL, EUROPEAN POLYMER JOURNAL., vol. 61, 1 Dec. 2014 (2014-12-01), pages 133-144, discloses free radical polymerization of (2-oxo-1, 3-dioxolan-4-yl)methy methacrylate (GCMA).

U.S. Pat. No. 5,045,602 discloses moisture-hardening binder compositions based on copolymers containing anhydride and carbonate groups and compounds containing blocked amino groups which are suitable for crosslinking the copolymers.

U.S. Pat. No. 4,882,391 discloses non-crosslinked reaction products of compounds (A) which contain structural units carrying 1,3-dioxolan-2-one groups and compounds (B) which contain at least one primary aliphatic or cycloaliphatic amino group and additionally at least one further basic amino group.

WO 2012/130718 discloses a two component coating composition which do not comprise any polyisocyanates or melamine-formaldehyde resins as crosslinkers for curing.

SUMMARY OF THE INVENTION

It has been found by the present inventor(s) that carbon-based hydrolysable polymers comprising monomers of general formula I (see further below) can provide, or improve the antifouling properties of, a coating composition comprising an erodible binder system.

So, in a first aspect the present invention relates to an antifouling coating composition, cf.

A second aspect of the invention relates to an antifouling coat, cf. claim 21.

A third aspect of the invention relates to a marine structure, cf. claim 23.

A fourth aspect of the invention relates to the use of carbon-based hydrolysable polymer(s) as a co-binder for improving the antifouling properties of a coating composition comprising an erodible binder system, cf. claim 24.

The invention further relates to novel carbon-based hydrolysable co-polymers.

DETAILED DESCRIPTION OF THE INVENTION

The present invention relates to antifouling coating compositions and to antifouling coats prepared from such coating compositions, as well as the novel polymers useful in such compositions and coats.

Coating compositions (occasionally referred to as "paints" or "paint compositions") typically consists of a binder phase (which forms the paint film upon drying and thereby corresponds to the continuous phase of the final paint coat, and which may be referred to as the "binder system") and a pigments phase (corresponding to the discontinuous phase of the final paint coat).

The binder systems applicable in the present invention are erodible binder systems. It is believed that the erodible nature of the binder system at least in part resides in the use of the particular carbon-based hydrolysable polymers comprising monomers of the general formula I which will be described in detail in the following.

The Antifouling Coating Compositions

The present invention provides an antifouling coating composition comprising one or more carbon-based hydrolysable polymers of ethylenically unsaturated monomers, wherein the monomers (i.e. the monomers used to make up the co-polymer(s)) include at least one monomer of the general formula I

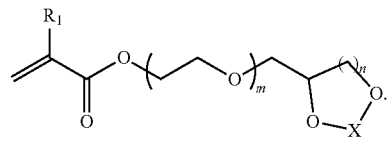

As will be described in the following, such polymers are typically used as a co-binder, but may in principle also be used as the sole binder component. The co-polymers applicable in the context of the present invention will be described in the following.

The Carbon-Based Hydrolysable Polymers

The carbon-based hydrolysable polymers useful for the coating compositions described herein are made up of one or more ethylenically unsaturated monomers which upon polymerisation form (co-)polymer chains where the monomers are distributed. In some embodiments, the polymer (then referred to as a homopolymer) is solely made up of a monomer of general formula I. In other embodiments, the polymer (then referred to as a co-polymer) is made up of two or more different monomers, e.g. different monomers or general formula I or one or more monomers of general formula I and one or more other ethylenically unsaturated monomers. In the latter instances, the distribution of monomers is typically random.

Generally, the carbon-based hydrolysable polymer (either a homopolymer or a co-polymer) is made up of ethylenically unsaturated monomers, wherein the monomers include at least one monomer of the general formula I:

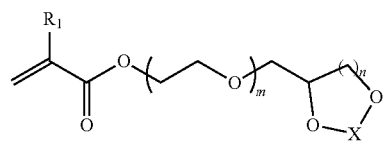

I wherein m is 0-50, n is 1-3, $R_1$ is selected from hydrogen and methyl, and X is selected from >C=O or >C($R_2$)($R_3$), where $R_2$ and $R_3$ are independently selected from hydrogen, $C_{1-20}$-alkyl and aryl.

In the present context, the term "$C_{1-20}$-alkyl" is intended to mean a straight-chained or branched moiety (possibly including a cyclic motif) having 1 to 20 carbon atoms. Likewise "$C_{1-6}$-alkyl" and "$C_{1-3}$-alkyl" presents such hydrocarbon moieties having 1-6 carbon atoms and 1-3 carbon atoms, respectively. $C_{1-6}$-alkyl, and in particular $C_{1-3}$-alkyl, are preferred variants of $C_{1-20}$-alkyl, e.g. like methyl, ethyl, 1-propyl, 2-propyl, 1-butyl, 2-butyl, tert-butyl, etc.

In the present context, the term "aryl" is intended to mean an aromatic moiety, like phenyl, naphthyl, etc., in particular phenyl.

$R_1$ is either hydrogen (corresponding to an acrylate) or methyl (corresponding to a methacrylate).

The integer m indicates the number of any oxyethylene units in between the (meth)acrylate and the ring structure.

In some embodiments, m is 0, i.e. where no oxyethylene groups are present, like for (2,2-dimethyl-1,3-dioxolan-4-yl)methyl acrylate (IPGA), (2,2-dimethyl-1,3-dioxolan-4-yl)methyl methacrylate (IPGMA), (2-oxo-1,3-dioxolan-4-yl)methyl acrylate (GCA) and (2-oxo-1,3-dioxolan-4-yl) methyl methacrylate (GCMA).

In other embodiments, m is 1-50, such as 1-20 or 1-10, like 1-6, in particular 1-5, i.e. where an oxyethylene bridge is used to link (meth)acrylic polymer backbone and the hydrolysable pending moiety and possibly also provides hydrophilic properties to the polymer. This is the case for isopropylidene glycerol ethoxylated acrylate (iPGEOA) and isopropylidene glycerol ethoxylated methacrylate (iPGEOMA). In another embodiment, m is 1-12. In an embodiment, m is 0 or 5. In an embodiment, m is 5.

The integer n signifies the size of the ring structure and is 1-3, especially 1. In an embodiment, n is 1 or 2. In another embodiment, n is 1. In another embodiment, n is 2. For example, the hydrolysable moiety is a five-membered heterocycle (n=1), or a six-membered heterocycle (n=2), or a seven-membered heterocycle (n=3), preferably a five-membered heterocycle.

Insofar that X is >C=O, the ring structure represents cyclic carbonate, e.g. a 2-oxo-1,3-dioxolan hydrolysable group.

Hence, in some embodiments the monomers of the general formula I are of the general formula II:

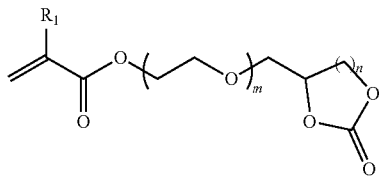

wherein $R_1$, m and n are as defined for general formula I. In an embodiment, n is 1 or 2. Preferably n is 1. In an embodiment, m is 0.

Insofar that X is >C($R_2$)($R_3$), the ring structure is a cyclic ketal or cyclic acetal, e.g. an isopropylidene hydrolysable group, or a isobutylidene hydrolysable group, or similar hydrolysable groups. Typically, $R_2$ and $R_3$ are independently selected from $C_{1-6}$-alkyl, such as $C_{1-3}$-alkyl, like methyl, ethyl, 1-propyl and 2-propyl. In some currently preferred embodiments, $R_2$ and $R_3$ are both methyl.

Hence, in some other embodiments the monomers of the general formula I are of the general formula III:

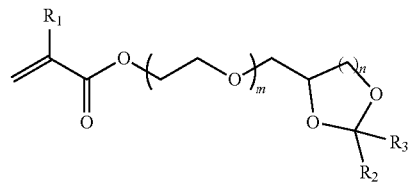

wherein $R_1$, $R_2$, $R_3$, m and n are as defined for general formula I. In an embodiment, n is 1 or 2. Preferably n is 1. In an embodiment, $R_2$ and $R_3$ are both methyl. In an embodiment, m is 0 or 5.

In still other embodiments, the monomers of the polymer include monomers of general formula II as well as monomers of general formula III.

In an embodiment, the monomer of formula I is (2,2-dimethyl-1,3-dioxolan-4-yl)methyl methacrylate (IPGMA).

In an embodiment, the monomer of formula I is (2,2-dimethyl-1,3-dioxolan-4-yl)methyl acrylate (IPGA).

In an embodiment, the monomer of formula I is isopropylidene glycerol ethoxylated methacrylate (iPGEOMA).

In an embodiment, the monomer of formula I is isopropylidene glycerol ethoxylated acrylate (iPGEOA).

In an embodiment, the monomer of formula I is (2-oxo-1,3-dioxolan-4-yl)methyl methacrylate (GCMA).

In an embodiment, the monomer of formula I is (2-oxo-1,3-dioxolan-4-yl)methyl acrylate (GCA).

In some preferred embodiments, the monomers include at least one of (2,2-dimethyl-1,3-dioxolan-4-yl)methyl (meth)acrylate (IPGA/IPGMA), isopropylidene glycerol ethoxylated (meth)acrylate (e.g. where n=1-50) (iPGEO(M)A) and (2-oxo-1,3-dioxolan-4-yl)methyl (meth)acrylate (GCA/GCMA), i.e. at least one of (2,2-dimethyl-1,3-dioxolan-4-yl)methyl acrylate (IPGA), (2,2-dimethyl-1,3-dioxolan-4-yl)methyl methacrylate (IPGMA), isopropylidene glycerol ethoxylated acrylate (iPGEOA) and isopropylidene glycerol ethoxylated methacrylate (iPGEOMA), (2-oxo-1,3-dioxolan-4-yl)methyl acrylate (GCA) and (2-oxo-1,3-dioxolan-4-yl)methyl methacrylate (GCMA).

In an embodiment, the monomer of formula I is at least one of (2,2-dimethyl-1,3-dioxolan-4-yl)methyl (meth)acrylate (IPGA/IPGMA), and isopropylidene glycerol ethoxylated (meth)acrylate (iPGEO(M)A).

In an embodiment, the monomer of formula I is at least one of (2,2-dimethyl-1,3-dioxolan-4-yl)methyl methacrylate (IPGMA), isopropylidene glycerol ethoxylated methacrylate (iPGEOMA) and (2-oxo-1,3-dioxolan-4-yl)methyl acrylate (GCA).

Without being bound to any particular theory, it is believed that the presence of the side chains of the monomers of general formula I, such as those of general formula II and general formula III, renders the polymer relatively more soluble in water, in particular seawater, upon decomposition of the respective moieties to the corresponding diols. As a matter of fact, the hydrolysable groups of the monomer of general formula I used to enable the insoluble to soluble switch of the polymer are known protective groups of diols, e.g. as disclosed in "Protective Groups in Organic Synthesis" by T. W Greene and P. G. M. Wuts.

In the polymer(s), the monomers of general formula I, in particular of general formula II or general formula III, such as the monomers IPGA/IPGMA, iPGEOA/iPGEOMA and/or GCA/GCMA, in total typically constitute 5-100% by weight, 5-99% by weight, such as 25-95% by weight, or 40-90% by weight, of the polymer.

In some preferred embodiments, the polymers comprise monomers selected from (2,2-dimethyl-1,3-dioxolan-4-yl)methyl acrylate (IPGA), (2,2-dimethyl-1,3-dioxolan-4-yl)methyl methacrylate (IPGMA), isopropylidene glycerol ethoxylated acrylate (iPGEOA) and isopropylidene glycerol ethoxylated methacrylate (iPGEOMA), in particular (2,2-dimethyl-1,3-dioxolan-4-yl)methyl methacrylate (IPGMA).

In other preferred embodiments, the polymers comprises monomers selected from (2-oxo-1,3-dioxolan-4-yl)methyl acrylate (GCA) and (2-oxo-1,3-dioxolan-4-yl)methyl methacrylate (GCMA), in particular (2-oxo-1,3-dioxolan-4-yl)methyl acrylate (GCA).

In addition to the monomers of general formula I, in particular of general formula II or general formula III, such as in particular IPG/IPGMA, iPGEOA/iPGEOMA and GCA/GCMA monomers, as specified above, the polymers are made up of one or more ethylenically unsaturated monomers other than those of general formula I, e.g. those selected from acrylic acid, methacrylic acid, (meth)acrylates such as methyl (meth)acrylate (MMA) (acrylate and methacrylate are collectively described as "(meth)acrylate"; and hereinafter the same applies), ethyl (meth)acrylate, propyl (meth)acrylate, isopropyl (meth)acrylate, butyl (meth)acrylate, isobutyl (meth)acrylate, tert-butyl (meth)acrylate, pentyl (meth)acrylate, hexyl (meth)acrylate, cyclohexyl (meth)acrylate, octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate, stearyl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, 2-hydroxy-3-phenoxypropyl (meth)acrylate, 2-methoxyethyl (meth)acrylate (MOXE(M)A), 2-ethoxymethyl (meth)acrylate, 4-methoxybutyl (meth)acrylate, methoxypropyl (meth)acrylate, propoxyethylethyl (meth)acrylate, 2-butoxyethyl (meth)acrylate, isobutoxyethyl (meth)acrylate, isobutoxybutyl diglycol (meth)acrylate, triisopropylsilyl(meth)acrylate (TiPS(M)A), and phenoxyethyl (meth)acrylate; multifunctional (meth)acrylates such as tetraethylene glycol diacrylate, tripropylene glycol diacrylate, 1,3-butanediol di(meth)acrylate, 1,4-butanediol di(meth)acrylate, 1,6-hexanediol diacrylate, ethylene glycol dimethacrylate, trimethylolpropane triacrylate, trimethylolpropane trimethacrylate, di(trimethylolpropane) tetraacrylate, pentaerythritol triacrylate, pentaerythritol tetraacrylate, and dipentaerythritol pentaacrylate; and vinyl monomers such as vinyl acetate, isobutyl vinyl ether, styrene, vinyl toluene, (meth)acrylonitrile, and vinyl propionate.

In some preferred embodiments, the one or more ethylenically unsaturated monomers (other than those of general formula I) are selected from (meth)acrylates, in particular from methyl (meth)acrylate (MA/MMA), methoxy ethyl (meth)acrylate (MOXEA/MOXEMA), butyl (meth)acrylate (BA/BMA), styrene, triisopropylsilyl(meth)acrylate (TiPSA/TiPSMA) and (meth)acrylic acid (AAc/MAAc).

In some embodiments, the weight average molecular weight (M) of the polymer is 2-500 kDa, such as 5-200 kDa, or 10-100 kDa.

In one embodiment, the polymer is made up of monomers of the general formula I, in particular general formula II or general formula III, especially one or more selected from IPGA, IPGMA, iPGEOA, iPGEOMA, GCA and GCMA, in combination with one or more non-hydrolysable (meth)acrylate monomers.

In another embodiment, the polymer is made up of monomers of the general formula I, in particular general formula II or general formula III, especially one or more selected from IPGA, IPGMA, iPGEOA, iPGEOMA, GCA and GCMA, in combination with one or more hydrolysable silyl (meth)acrylate monomers, e.g. of general formula (A) herein, such as triisopropylsilyl(meth)acrylate (TIPSA/TIPSMA), and optionally one or more non-hydrolysable (meth)acrylate monomers.

In some embodiments, the ethylenically unsaturated monomer(s) other than those of general formula I are selected from methyl methacrylate (MMA), methoxy ethyl acrylate (MOXEA), and triisopropylsilylacrylate (TiPSA).

In some embodiments, the ethylenically unsaturated monomer(s) other than those of general formula I are methyl methacrylate (MMA) optionally in combination with methoxy ethyl acrylate (MOXEA) and/or triisopropylsilylacrylate (TiPSA).

In some embodiments, the co-polymer has a molar ratio of monomers of general formula I to other ethylenically unsaturated monomers, like (meth)acrylate monomers, of from 20:80 to 80:20. In some embodiments, the co-polymer has a weight ratio of monomers of general formula I to other ethylenically unsaturated monomers, like (meth)acrylate monomers, of from 20:80 to 80:20.

In one particular embodiment, the polymer is a ter-polymer of MOXEA, MMA and one of IPGA/IPGMA, iPGEOA/iPGEOMA and GCA/GCMA, e.g. a ter-polymer having the following approximate proportions of monomers from 5:25:70 to 15:15:70 to 10:40:50, such as a weight ratio of monomers from 5:25:70 to 15:15:70 to 10:40:50.

In another embodiment, the polymer is a ter-polymer of TIPSA, MMA and one of IPGA/IPGMA, iPGEOA/iPGEOMA and GCA/GCMA, e.g. a ter-polymer having the following weight ratio of monomers from 10:20:70 to 30:20:50 to 20:20:60.

In another embodiment, the polymer is a ter-polymer of TiPSA, one or more of IPGA/IPGMA, iPGEOA/iPGEOMA and GCA/GCMA, and one or more other (meth)acrylic monomer(s) (like MMA), e.g. a ter-polymer having the following approximate proportions of monomers from 10:20:70 to 30:20:50 to 20:20:60, such as a weight ratio of monomers from 10:20:70 to 30:20:50 to 20:20:60.

In still other embodiment, the polymer is a bis-polymer of MMA and one of IPGA/IPGMA, iPGEOA/iPGEOMA and GCA/GCMA, e.g. a bis-polymer having the following approximate proportions of monomers from 20:80 to 80:20, such as a bis-polymer having the following weight ratio of monomers from 20:80 to 80:20.

In still other embodiment, the polymer is a bis-polymer of TIPSA and one of IPGA/IPGMA, iPGEOA/iPGEOMA and GCA/GCMA, e.g. a bis-polymer having the following weight ratio of monomers from 20:80 to 80:20.

In another embodiment, the monomers of general formula I in total constitute 25-95% by weight of the polymer.

In another embodiment, the monomers of general formula I in total constitute 30-70% by weight of the polymer.

In another embodiment, the monomers (2,2-dimethyl-1,3-dioxolan-4-yl)methyl (meth)acrylate (IPGA/IPGMA) and/or isopropylidene glycerol ethoxylated (meth)acrylate (iPGEO(M)A) in total constitute 25-95% by weight of the polymer, such as 30-70% by weight of the polymer.

In another embodiment, the ethylenically unsaturated monomer(s) other than those of general formula I in total constitute 5-75% by weight of the polymer, such as 30-70% by weight of the polymer.

In another embodiment, the ethylenically unsaturated monomer(s) other than those of general formula I are selected from (meth)acrylates and constitute in total 5-75% by weight of the polymer, such as 30-70% by weight of the polymer.

In another embodiment, the ethylenically unsaturated monomer(s) other than those of general formula I are selected from one or more of methyl methacrylate (MMA), methoxy ethyl acrylate (MOXEA), and triisopropylsilylacrylate (TiPSA) and constitute in total 5-75% by weight of the polymer, such as 30-70% by weight of the polymer.

The Binder System

The polymer may be the sole binder component of a binder system, but preferably, the polymer is used in combination with other binder component like polymers, copolymers and rosins, as will be described further below. The combination of the particular carbon-based hydrolysable polymers specified above and any further polymers, copolymers and rosins is commonly referred to as the binder system which constitutes the binder phase, i.e. the continuous phase, of the final coat.

Typically, the polymer constitutes 2-60%, such as 10-35%, by solids volume of the coating composition (or the antifouling coat).

In most practical embodiments, the binder system in total constitutes 18-80% by solids volume of the coating composition (or the antifouling coat). In preferred embodiments, the binder system constitutes 20-70% by solids volume, such as 25-55% by solids volume of the coating composition (or the antifouling coat).

When expressed by dry weight, typically the binder system in total constitutes 15-75% by dry weight of the coating composition (or the antifouling coat). In preferred embodiments, the binder system constitutes 16-60%, such as 18-40%, by dry weight of the coating composition (or the antifouling coat).

The binder systems described herein are typically of the erodible type.

When used herein, the term "erodible" (occasionally referred to as "self-polishing") is intended to mean that the paint coat (i.e. the dried film of the coating composition) should have a polishing rate of at least 0.5 µm per 10,000 Nautical miles (18,520 km) determined in accordance with the "Polishing rate test" specified in the Examples section. In preferred embodiments, the polishing rate is in the range of 1-50 µm, in particular in the range of 1-30 µm, per 10,000 Nautical miles (18,520 km).

The binder phase of the coating composition forms the paint film upon drying and thereby corresponds to the continuous phase of the final (dry) paint coat.

It is envisaged that all erodible binder components conventionally used in "self-polishing" coating compositions may be used as the binders components of the present coating composition in addition to the above-specified carbon-based hydrolysable polymers.

For the purpose of illustrating the scope of the present invention with respect to possible types of binder components, a number of examples of binder components for marine purposes and yacht purposes, are provided in the following.

It is believed that, the following types of constituents within the binder system are especially interesting: non-aqueous dispersion binder systems, silylated acrylate binder systems, metal acrylate binder system, hybrids of silylated acrylate and metal acrylate binder systems, polyoxalate binder systems, zwitterion binder systems, hybrids of silylated acrylate, zwitterion binder systems, polyester binder system, (natural) rosin, rosin derivatives, disproportionated rosin, partly polymerised rosin, hydrogenated rosin, gum rosin, disproportionated gum rosin, acrylic resins, polyvinyl methyl ether, and vinyl acetate-vinylchloride-ethylene terpolymers.

Among these, it is believed that rosin binder systems, non-aqueous dispersion binder systems, silylated acrylate binder systems, metal acrylate binder system, hybrids of silylated acrylate and metal acrylate binder systems, polyoxalate binder systems, zwitterion binder systems, hybrids of silylated acrylate, zwitterion binder systems and polyester binder systems, are especially interesting.

Particularly preferred binder systems are binder system comprising constituents selected from rosin based binder systems, silyl acrylate binder systems, non-aqueous dispersion based binder systems, and metal-acrylate based binder systems.

Particularly preferred binder systems are binder systems comprising constituents selected from rosin based binder systems, optionally in combination with silyl acrylate binder systems, non-aqueous dispersion based binder systems, and metal-acrylate based binder systems.

Some of these binder systems will—for illustrative purposes—be described in further detail in the following.

Non-Aqueous Dispersion Binder System

The terms "non-aqueous dispersion resin", "NAD" and similar expressions are intended to mean a shell-core structure that includes a resin obtained by stably dispersing a high-polarity, high-molecular weight resin particulate component (the "core component") into a non-aqueous liquid medium in a low-polarity solvent using a high-molecular weight component (the "shell component").

The non-aqueous dispersion resin may be prepared by a method wherein a polymerisable ethylenically unsaturated monomer which is soluble in a hydrocarbon solvent and which is polymerisable to form a polymer (the core component) which is insoluble in the hydrocarbon solvent, is subjected to dispersion polymerisation in accordance with a conventional method in the hydrocarbon solvent in the presence of a shell component (the dispersion stabiliser) made of a polymer which dissolves or swells in the solvent.

The non-aqueous dispersion-type resin utilised in this invention can be a resin known per se; or it can be produced like the known resins. Such non-aqueous dispersion-type resins and method for their preparation are described in, e.g., U.S. Pat. Nos. 3,607,821, 4,147,688, 4,493,914 and 4,960,828, Japanese Patent Publication No. 29,551/1973 and Japanese Laid-open Patent Application No. 177,068/1982. Specifically, as the shell component constituting the non-aqueous dispersion-type resin, various high-molecular substances soluble in a low-polarity solvent which are described in, e.g., U.S. Pat. No. 4,960,828 (Japanese Laid-Open Patent Application No. 43374/1989), can be used.

From the aspect of antifouling property of the final paint coat, shell components such as an acrylic resin or a vinyl resin may be used.

As the core component, a co-polymer of an ethylenically unsaturated monomer having a high polarity is generally applicable. Preferably the core component of the non-aqueous dispersion-type resin has free acid groups or silyl ester groups that are convertible into the acid group by hydrolysis in sea water or combinations thereof. Preferably 5-75% by weight, e.g. 5-60% by weight or 7-50% by weight, of the monomers of the core polymer should carry free acid groups or silyl ester groups or combinations thereof. As the free acid groups will have direct influence on the properties of the paint formulation, whereas the silyl ester groups will only have influence after hydrolysis in seawater, it is presently preferred to have an overweight of free acid groups.

Examples of silyl ester monomers are silyl esters of acrylic or methacrylic acid.

If desired, a smaller proportion of the free acid groups or silyl ester groups may also be contained in the shell component.

The expression "free acid group" is intended to cover the acid group in the acid form. It should be understood that such acid groups temporarily may exist on salt form if a suitable counter ion is present in the composition or in the environment. As an illustrative example, it is envisaged that some free acid groups may be present in the sodium salt form if such groups are exposed to salt water.

Preferably the non-aqueous dispersion-type resin has a resin acid value of usually 15-400 mg KOH/g, preferably 15 to 300 mg KOH/g, such as 18 to 300 mg KOH/g. If the total acid value of the NAD resin is below 15 mg KOH/g, the polishing rate of the paint coat is too low and the antifouling property will often be unsatisfactory. On the other hand, if the total acid value is above 400 mg KOH/g, the polishing rate is too high for that reason a problem of water resistance (durability of the paint coat in seawater) becomes a problem. (When the core component and/or the shell component contain the acid precursor group, the resin acid value is one given after the group is converted into the acid group by hydrolysis). The "resin acid value" here referred to is an amount (mg) of KOH consumed to neutralise 1 g of a resin (solids content), expressing a content of an acid group (in case of the acid precursor group, a content of an acid group formed by hydrolysis) of the resin (solids content).

It is advisable that the acid group and/or the acid precursor group is contained in the core component such that the content thereof is, as a resin acid value, at least 80%, preferably at least 90%, more preferably at least 95% of the total resin acid value of the non-aqueous dispersion-type resin.

This being said, it is normally preferred that the shell component is hydrophobic. The dry weight ratio of the core component to the shell component in the NAD resin is not especially limited, but is normally in the range of 90/10 to 10/90, preferably 80/20 to 25/75, such as 60/40 to 25/75.

Hence, in one embodiment, the coating composition further (i.e. in addition to the carbon-based hydrolysable polymer) comprises as a co-binder a non-aqueous dispersion binder component, wherein said binder component comprises a resin having a core-shell structure which is constituted of (a) a hydrophilic core component comprising a polymer of ethylenically unsaturated monomers, and (b) a shell component comprising a polymer of ethylenically unsaturated monomers.

Silylated Acrylate Binder System

In another interesting embodiment of the invention the binder system to be used in the coating composition according to the invention comprises a silylated acrylate co-polymer having at least one side chain bearing at least one terminal group of the general formula (A):

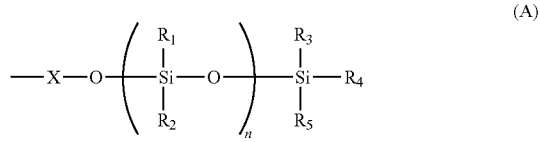

(A)

wherein n is an integer of 0, 1, 2, etc., and X is —C(=O)—, and $R_1$, $R_2$, $R_3$, $R_4$ and $R_5$ are as defined below.

While n is an integer of 0, 1, 2, 3, 4 or more, it is in these cases preferred that n is 0-100, e.g. 0-50, such as 0 or 1 or 2 or 2-15.

$R_1$-$R_5$ are each groups being the same or different and being selected from $C_{1-20}$-alkyl (e.g. methyl, ethyl, propyl, butyl, cycloalkyl such as cyclohexyl); optionally substituted aryl (e.g. substituted phenyl and substituted naphthyl). Examples of substituents for aryl are halogen, $C_{1-5}$-alkyl, $C_{1-10}$-alkylcarbonyl, sulphonyl, nitro, or amino. Typically $R_1$-$R_5$ are each selected from $C_{1-5}$-alkyl and optionally substituted phenyl. It is generally preferred that each of the alkyl groups has up to about 5 carbon atoms ($C_{1-5}$-alkyl). As indicated above, $R_1$-$R_5$ may be the same or different groups.

Monomers comprising the terminal groups of the general formula (A) above may be synthesised as described in EP 0 297 505 B1.

Such monomers may be co-polymerised with a vinyl polymerisable monomer (A) in order to obtain a co-polymer. Examples of suitable vinyl polymerisable monomers (A) include methacrylate esters such as methyl methacrylate, ethyl methacrylate, butyl methacrylate, 2-ethylhexyl methacrylate, 2-hydroxyethyl methacrylate and methoxy ethyl methacrylate; acrylate esters such as ethyl acrylate, butyl acrylate, 2 ethylhexyl acrylate and 2-hydroxyethyl acrylate; maleic acid esters such as dimethyl maleate and diethyl maleate; fumaric acid esters such as dimethyl fumarate and diethyl fumarate; styrene, vinyltoluene, α-methylstyrene, vinyl chloride, vinyl acetate, butadiene, acrylamide, acrylonitrile, methacrylic acid, acrylic acid, isobornyl methacrylate and maleic acid.

The amount of vinyl polymerisable monomers is not more than 95% by weight of the total weight of the resulting co-polymer, preferably not more than 90% by weight. Accordingly, the amount of monomers comprising the terminal groups of the general formula (A) above is at least 5% by weight, in particular at least 10% by weight.

The co-polymers preferably have weight average molecular weights in the range of 1,000-1,500,000, such as in the range of 5,000-1,500,000, e.g. in the range of 5,000-1,000,000, in the range of 5,000-500,000, in the range of 5,000-250,000, or in the range of 5,000-100,000.

In another interesting embodiment of the invention the binder system to be used in the coating composition according to the invention comprises a silylated acrylate co-polymer having at least one side chain bearing at least one terminal group of the general formula (A) (i.e. formula I wherein n=0):

(B)

wherein X, $R_3$, $R_4$ and $R_5$ are as defined above.

Examples of monomers having a terminal group of the general formula (B) (shown above) are acid functional vinyl polymerisable monomers, such as monomers derived from acrylic acid, methacylic acid, maleic acid (preferably in the form of a monoalkyl ester with 1-6 carbon atoms) or fumaric acid (preferably in the form of a monoalkyl ester with 1-6 carbon atoms).

Thus, specific examples of a suitable triorganosilyl group (i.e. the —Si($R_3$)($R_4$)($R_5$) group) shown in the general formula (A) or (B) include trimethylsilyl, triethylsilyl, trin-propylsilyl, tri-n-butylsilyl, tri-iso-propylsilyl, tri-n-pentylsilyl, tri-n-hexylsilyl, tri-n-octylsilyl, tri-n-dodecylsilyl, triphenylsilyl, tri-p-methylphenylsilyl, tribenzylsilyl, tri-2-methylisopropylsilyl, tri-tert-butyl-silyl, ethyldimethylsilyl, n-butyldimethylsilyl, di-iso-propyl-n-butylsilyl, n-octyl-di-n-butylsilyl, di-iso-propyloctadecylsilyl, dicyclohexylphenylsilyl, tert-butyldiphenylsilyl, dodecyldiphenyl-silyl and diphenylmethylsilyl.

Specific examples of suitable methacrylic acid-derived monomers bearing at least one terminal group of the general formula (A) or (B) include trimethylsilyl (meth)acrylate, triethyl-silyl(meth)acrylate, tri-n-propylsilyl(meth)acrylate, triisopropylsilyl (meth)acrylate, tri-n-butylsilyl (meth)acrylate, triisobutylsilyl (meth)acrylate, tri-tert-butylsilyl(meth) acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)-acrylate, tribenzylsilyl (meth) acrylate, ethyldimethylsilyl (meth)acrylate, n-butyldimethylsilyl (meth)acrylate, diisopropyl-n-butylsilyl (meth)acrylate, n-octyldi-n-butylsilyl (meth)acrylate, diisopropylstearylsilyl (meth)acrylate, dicyclohexylphenylsilyl (meth)acrylate, t-butyldiphenyl-silyl (meth)acrylate, and lauryldiphenylsilyl (meth)acrylate.

Specific examples of suitable maleic acid-derived and fumaric acid-derived monomers bearing at least one terminal group of the general formula (A) or (B) include triisopropylsilyl methyl maleate, triisopropylsilyl amyl maleate, tri-n-butylsilyl n-butyl maleate, tert-butyldiphenylsilyl methyl maleate, t-butyldiphenylsilyl n-butyl maleate, triisopropylsilyl methyl fumarate, triisopropylsilyl amyl fumarate, tri-n-butylsilyl n-butyl fumarate, tert-butyldiphenylsilyl methyl fumarate, and tert-butyldiphenylsilyl n-butyl fumarate.

In an interesting embodiment of the present invention, the co-polymer to be used in the binder system comprises monomer units with a terminal group of the general formulae (A) or (B) (as discussed above) in combination with a second monomer of the general formula (C):

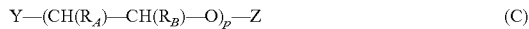

Y—(CH($R_A$)—CH($R_B$)—O)$_p$—Z    (C)

wherein Z is a $C_{1-20}$-alkyl group or an aryl group; Y is an acryloyloxy group, a methacryloyloxy group, a maleinoyloxy group or a fumaroyloxy group; $R_A$ and $R_B$ are independently selected from the group consisting of hydrogen, $C_{1-20}$-alkyl and aryl; and p is an integer of 1 to 25. If p>2, $R_A$ and $R_B$ are preferably hydrogen or $CH_3$, i.e. if p>2 the monomer B is preferably derived from a polyethylene glycol or a polypropylene glycol. If p=1 it is contemplated that monomers, wherein $R_A$ and $R_B$ are larger groups, such as $C_{1-20}$-alkyl or aryl, may also be useful for the purposes described herein. As shown in general formula (C), the monomer has in its molecule an acryloyloxy group, a methacryloyloxy group, a maleinoyloxy group (preferably in the form of a mono-$C_{1-6}$-alkyl ester), or a fumaroyloxy group (preferably in the form of a mono-$C_{1-6}$-alkyl ester) as an unsaturated group (Y) and also alkoxy- or aryloxypolyethylene glycol. In the alkoxy- or aryloxypolyethylene glycol group, the degree of polymerisation (p) of the polyethylene glycol is from 1 to 25.

Specific examples of monomer B which has a (meth) acryloyloxy group in a molecule include methoxyethyl (meth)acrylate, ethoxyethyl (meth)acrylate, propoxyethyl (meth)acrylate, butoxyethyl (meth)acrylate, hexoxyethyl (meth)acrylate, methoxydiethylene glycol (meth)acrylate, methoxytriethylene glycol (meth)acrylate, ethoxydiethylene glycol (meth)acrylate, and ethoxytriethylene glycol (meth) acrylate.

Specific examples of monomer B which has a maleinoyloxy or fumaroyloxy group in a molecule include methoxyethyl n-butyl maleate, ethoxydiethylene glycol methyl maleate, ethoxytriethylene glycol methyl maleate, propoxydiethylene glycol methyl maleate, butoxyethyl methyl maleate, hexoxyethyl methyl maleate, methoxyethyl n-butyl fumarate, ethoxydiethylene glycol methyl fumarate, ethoxytriethylene glycol methyl fumarate, propoxydiethylene glycol methyl fumarate, butoxyethyl methyl fumarate, and hexoxyethyl methyl fumarate.

As will be understood by the person skilled in the art, other vinyl monomers may be incorporated in the resulting co-polymer comprising either monomer units having a terminal group of the general formulae (A) or (B) (shown above) or in the resulting co-polymer comprising monomer units having a terminal group of the general formulae (A) or (B) (shown above) in combination with the second monomer of the formula (C) (shown above).

With respect to other monomers co-polymerisable with the above-mentioned monomers, use may be made of various vinyl monomers such as the vinyl polymerisable monomers (A) discussed above.

It is preferred that the proportion of the monomer having a terminal group of the general formulae (A) or (B) is from 1-95% by weight, that of monomer B is from 1-95% by weight, and that of other monomer(s) co-polymerisable therewith is from 0-95% by weight on the basis of the total weight of the monomers.

The molecular weight of the resulting co-polymer thus obtained is desirably in the range of 1,000-150,000, such as in the range of 3,000-100,000, e.g. in the range of 5,000-100,000 in terms of weight-average molecular weight.

In a further interesting embodiment of the present invention, the binder system to be used in the coating composition according to the invention comprises a co-polymer having monomer units with a terminal group of the general formulae (A) or (B) (as discussed above) in combination with a second monomer of the general formula (D):

$$\begin{array}{c} R_6 \\ | \\ Y-CH \\ | \\ OR_7 \end{array} \quad (D)$$

wherein Y is an acryloyloxy group, a methacryloyloxy group, a maleinoyloxy group or a fumaroyloxy group, and both of $R_6$ and $R_7$ are $C_{1-12}$-alkyl.

As shown in general formula (D), the monomer has in its molecule an acryloyloxy group, a methacryloyloxy group, a maleinoyloxy group (preferably in the form of a mono-$C_{1-6}$-alkyl ester), or a fumaroyloxy group (preferably in the form of a mono-$C_{1-6}$-alkyl ester) as an unsaturated group (Y) and also a hemi-acetal group.

The monomer of general formula (D) can be prepared by an ordinary addition reaction of a carboxy group-containing vinyl monomer selected from acrylic acid, methacrylic acid, maleic acid (or monoester thereof), and fumaric acid (or monoester thereof), with an alkyl vinyl ether (e.g. ethyl vinyl ether, propyl vinyl ether, butyl vinyl ether, hexyl vinyl ether, and 2-ethylhexyl vinyl ether), or a cycloalkyl vinyl ether (e.g. cyclohexyl vinyl ether).

As will be understood by the person skilled in the art, other vinyl monomers may be incorporated in the resulting co-polymer comprising monomer units having a terminal group of the general formulae (A) or (B) (shown above) in combination with the second monomer of the formula (D) (shown above).

With respect to other monomers co-polymerisable with the above-mentioned monomers, use may be made of various vinyl monomers such as the vinyl polymerisable monomers (A) discussed above.

It is preferred that the proportion of the monomer having a terminal group of the general formulae (A) or (B) is from 1-95% by weight (preferably from 1-80% by weight), that of monomer of the general formula (D) is from 1-95% by weight (preferably from 1-80% by weight), and that of other monomer(s) co-polymerisable therewith is up to 98% by weight on the basis of the total weight of the monomers.

The molecular weight of the co-polymer is desirably in the range of 1,000-150,000, preferably in the range of 3,000-100,000, such as in the range of 5,000-100,000 in terms of weight-average molecular weight.

Hence, in one embodiment, the coating composition as a part of the binder system further (i.e. in addition to the carbon-based hydrolysable polymer) comprises as a co-binder a silylated acrylate co-polymer having at least one side chain bearing at least one terminal group of the general formula (A) (also see above):

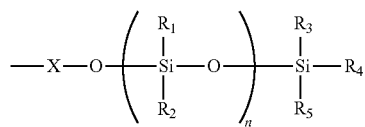
(A)

wherein n is an integer of 0-100, X is —C(=O)—, and $R_1$, $R_2$, $R_3$, $R_4$ and $R_5$ are each independently selected from $C_{1-20}$-alkyl and optionally substituted aryl.

Metal Acrylate Binder System

In an interesting embodiment of the invention, the binder system to be used in the coating composition according to the invention comprises a metal acrylate co-polymer having at least one side chain bearing at least one terminal group of the general formula (E):

—X—O-M-(L)$_n$   (E)

wherein X is —C(=O)—, —S(=O)$_2$—, —P(=O)(OH)—; M is a metal having a valency of 2 or more; n is an integer of 1 or more with the proviso that n+1 equals the metal valency; L is an organic acid residue and each L is independently selected from the group consisting of

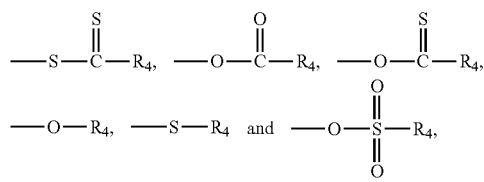

wherein $R_4$ is a monovalent organic residue, or L is —OH or combinations thereof; $R_3$ is hydrogen or a hydrocarbon group having from 1 to 10 carbon atoms.

Examples of monomers having a terminal group of the general formula (E) (shown above) are acid-functional vinyl polymerisable monomers, such as methacrylic acid, acrylic acid, p-styrene sulfonic acid, 2-methyl-2-acrylamide propane sulfonic acid, methacryl acid phosphoxy propyl, methacryl 3-chloro-2-acid phosphoxy propyl, methacryl acid phosphoxy ethyl, itaconic acid, maleic acid, maleic anhydride, monoalkyl itaconate (e.g. methyl, ethyl, butyl, 2-ethyl hexyl), monoalkyl maleate (e.g. methyl, ethyl, butyl, 2-ethyl hexyl; half-ester of acid anhydride with hydroxyl containing polymerisable unsaturated monomer (e.g. half-ester of succinic anhydride, maleic anhydride or phthalic anhydride with 2-hydroxy ethyl methacrylate. The above-mentioned monomers may be co-polymerised (in order to obtain the co-polymer with one or more vinyl polymerisable monomers. Examples of such vinyl polymerisable monomers are methyl acrylate, methyl methacrylate, ethyl acrylate, ethyl methacrylate, propyl acrylate, propyl methacrylate, butyl acrylate, butyl methacrylate, octyl acrylate, octyl methacrylate, 2-ethyl hexyl acrylate, 2-ethyl hexyl methacrylate, methoxy ethyl methacrylate, styrene, vinyl toluene, vinyl pyridine, vinyl pyrolidone, vinyl acetate, acrylonitrile, methacrylonitrile, dimethyl itaconate, dibutyl itaconate, di-2-ethyl hexyl itaconate, dimethyl maleate, di (2-ethyl hexyl) maleate, ethylene, propylene and vinyl chloride.

With respect to the ligand (L), each individual ligand is preferably selected from the group consisting of

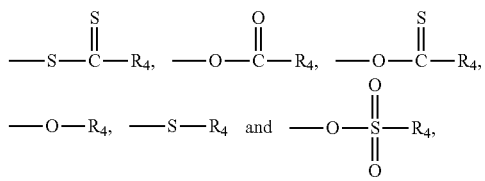

wherein $R_4$ is a monovalent organic residue. Preferably, $R_4$ is selected from the group consisting of

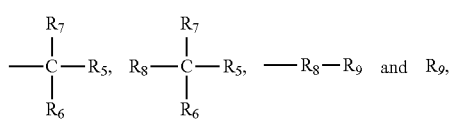

wherein $R_5$ is hydrogen or a hydrocarbon group having from 1 to 20 carbon atoms; $R_6$ and $R_7$ each independently represents a hydrocarbon group having from 1 to 12 carbon atoms; $R_8$ is a hydrocarbon group having from 1 to 4 carbon atoms; and $R_9$ is cyclic hydrocarbon group having from 5 to 20 carbon atoms, such as abietic acid, pallustric acid, neoabietic acid, levopimaric acid, dehydroabietic acid, pimaric acid, isopimaric acid, sandaracopimaric acid and A8,9-isopimaric acid.

Examples of compounds which may be used as ligands are:

(1) Compounds comprising the group

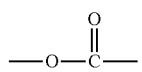

e.g. aliphatic acids, such as levulinic acid; alicyclic acids, such as naphthenic acid, chaulmoogric acid, hydnocarpusic acid, neo abietic acid, levo pimaric acid, palustric acid, 2-methyl-bicyclo-2,2,1-heptane-2-carboxylic acid; aromatic carboxylic acids such as salicylic acid, cresotic acid, α-naphthoic acid, β-naphthoic acid, p-oxy benzoic acid; halogen containing aliphatic acids, such as monochloro acetic acid, monofluoro acetic acid; halogen containing aromatic acids, such as 2,4,5-trichloro phenoxy acetic acid, 2,4-dichloro phenoxy acetic acid, 3,5-dichloro benzoic acid; nitrogen-containing organic acids, such as quinoline carboxylic acid, nitro benzoic acid, dinitro benzoic acid, nitronaphthalene carboxylic acid; lactone carboxylic acids, such as pulvinic acid, vulpinic acid; uracil derivatives, such as uracil-4-carboxylic acid, 5-fluoro uracil-4-carboxylic acid, uracil-5-carboxylic acid; penicillin-derived carboxylic acids, such as penicillin V, ampicillin, penicillin BT, penicillanic acid, penicillin G, penicillin O; Rifamycin B, Lucensomycin, Salcomycin, chloroamphenicol, variotin, Trypacidine; and various synthetic fatty acids.

(2) Compounds comprising the group

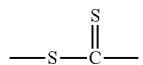

e.g. dimethyl dithiocarbamate and other dithiocarbamates.

(3) Compounds comprising the group

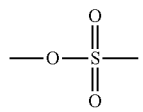

e.g. sulphur containing aromatic compounds, such as 1-naphthol-4-sulphonic acid, p-phenyl benzene sulphonic acid, β-naphthalene sulphonic acid and quinoline sulphonic acid.

(4) Compounds comprising the group —S—, such as compounds comprising the following groups

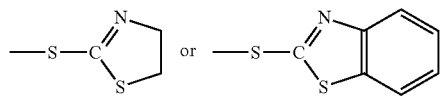

(5) Compounds comprising the group

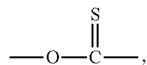

such as various thiocarboxylic compounds.

(6) Compounds comprising the group —O— or —OH, e.g. phenol, cresol, xylenol, thymol, carvacol, eugenol, isoeugenol, phenyl phenol, benzyl phenol, guajacol, butyl stilbene, (di) nitro phenol, nitro cresol, methyl salicylate, benzyl salicylate, mono-, di-, tri-, tetra- and penta-chlorophenol, chlorocresol, chloroxylenol, chlorothymol, p-chloro-o-cyclo-hexyl phenol, p-chloro-o-cyclopentyl phenol, p-chloro-o-n-hexyl phenol, p-chloro-o-benzyl phenol, p-chloro-o-benzyl-m-cresol and other phenols; β-naphthol, 8-hydroxy quinoline.

With respect to the metal (M), any metal having a valency of 2 or more may be used. Specific examples of suitable metals include Ca, Mg, Zn, Cu, Ba, Te, Pb, Fe, Co, Ni, Bi, Si, Ti, Mn, Al and Sn. Preferred examples are Co, Ni, Cu, Zn, Mn, and Te, in particular Cu and Zn. When synthesising the metal-containing co-polymer, the metal may be employed in the form of its oxide, hydroxide or chloride. The co-polymer to be used in the binder system in the coating composition according to the invention may be prepared as described in e.g. EP 0 471 204 B1, EP 0 342 276 B1 or EP 0 204 456 B1. Monomers comprising the terminal groups of the general formula V above may be co-polymerised (in order to obtain the co-polymer) with other polymerisable unsaturated monomers, any customarily used ethylenically unsaturated monomer may be used. Examples of such monomers are methyl acrylate, methyl methacrylate, ethyl acrylate, ethyl methacrylate, propyl acrylate, propyl methacrylate, butyl acrylate, butyl methacrylate, octyl acrylate, octyl methacrylate, 2-ethyl hexyl acrylate, 2-ethyl hexyl methacrylate, methoxy ethyl methacrylate, styrene, vinyl toluene, vinyl pyridine, vinyl pyrolidone, vinyl acetate, acrylonitrile, methacrylo nitrile, dimethyl itaconate, dibutyl itaconate, di-2-ethyl hexyl itaconate, dimethyl maleate, di (2-ethyl hexyl) maleate, ethylene, propylene and vinyl chloride. One particular type of co-monomers is acrylic or methacrylic esters wherein the alcohol residue includes a bulky hydrocarbon radical or a soft segment, for example a branched alkyl ester having 4 or more carbon atoms or a cycloalkyl ester having 6 or more atoms, a polyalkylene glycol monoacrylate or monomethacrylate optionally having a terminal alkyl ether group or an adduct of 2-hydroxyethyl acrylate or methacrylate with caprolactone, e.g. as described in EP 0 779 304 A1.

If desired, hydroxy-containing monomers, such as 2-hydroxy ethyl acrylate, 2-hydroxy ethyl methacrylate, 2-hydroxy propyl acrylate, 2-hydroxy propyl methacrylate may also be used.

It should be noted that in the resulting co-polymer, not all the organic acid side groups need to contain a metal ester bond; some of the organic acid side groups may be left un-reacted in the form of free acid, if desired.

The weight average molecular weight of the metal-containing co-polymer is generally in the range of from 1,000 to 150,000, such as in the range of from 3,000 to 100,000, preferably in the range of from 5,000 to 60,000.

In another interesting embodiment of the invention the coating composition further comprises an amount of an organic ligand at least equal to the ligand-to-metal co-ordination ratio of 1:1, said organic ligand being selected from the group consisting of aromatic nitro compounds, nitriles, urea compounds, alcohols, phenols, aldehydes, ketones, carboxylic acids and organic sulphur compounds, whereby the co-polymer defined above forms a polymer complex with the organic ligand in situ.

Examples of monobasic organic acids usable for forming the hybrid salt include monocarboxylic acids such as acetic, propionic, butyric, lauric, stearic, linolic, oleic, naphthenic, chloroacetic fluoroacetic, abietic, phenoxyacetic, valeric, dichlorophenoxyacetic, benzoic or napthoic acid; and monosulphonic acids such as benzenesulphonic acid, p-toluenesulphonic acid, dodecylbenzenesulphonic acid, naphthalenesulphonic or p-phenylbenzenesulforic acid.

A preferred method for producing the polymeric hybrid salt has been disclosed in Japanese Patent Kokai No. 16809/1989.

Silyl-Metal Acrylate Hybrid

An intriguing further example of an interesting binder is that being based on silyl acrylate monomers (as those described further above) as well as metal acrylate monomers (as those described further above). Such binders will have backbone fragments of the following general formula:

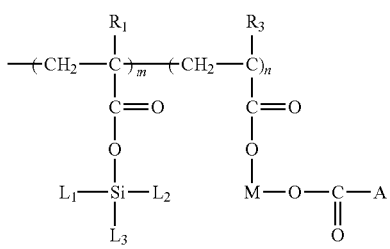

and are described e.g. in KR 20140117986.

Polyoxalate Binders

A further example of an interesting binder is that based on polyoxalates, e.g. as disclosed in WO 2015/114091.

Zwitterionic Binders and Hybrids with Silyl Acrylates

A still further example of an interesting binder is that based on polymer binders having zwitterion monomers possibly combined with silyl acrylate monomers, e.g. as disclosed in WO 2004/018533 and WO 2016/066567.

Polyester Binders

An even further example of an interesting binder is that based on polyesters, e.g. as disclosed in WO 2014/010702.

Rosin-Based Binder System

A further interesting binder system may be that based on rosin and/or rosin derivatives, possibly in combination with any of the before-mentioned binder systems.

Examples of constituents of such a rosin-based binder system are rosin, rosin derivatives such as metal salts of rosin i.e. resinates.

The terms "rosin", "resinate" and the like is intended to refer to gum rosin; wood rosin of grades B, C, D, E, F, FF, G, H, I, J, K, L, M, N, W-G, W-W (as defined by the ASTM 0509 standard); virgin rosin; hard rosin; yellow dip rosin; NF wood rosin; tall oil rosin; or colophony or colophonium. The terms "rosin" and "resinate" and the like are also intended to include suitable types of modified rosin, in particular oligomerisation; hydrogenation; dehydrogenation hydrogenation/disproportionation/dismutation; etc., that will reduce the amount of conjugated non-aromatic double bonds. It should be understood that the group of further binder components may include polymeric flexibilisers such as those generally and specifically defined in WO 97/44401 that is hereby incorporated by reference. In an embodiment, the rosin-based binder system comprises gum rosin, hydrogenated rosin and/or disproportionated rosin.

When expressed by dry weight, typically the rosin-based binder system constitutes 5-30% by dry weight of the coating composition. In preferred embodiments, the binder system constitutes 8-25%, such as 10-25%, by dry weight of the coating composition.

In most practical embodiments, the rosin based binder system constitutes 10-50% by solids volume of the coating composition. In preferred embodiments, the binder system constitutes 12-45% by solids volume, such as 15-40% by solids volume of the coating composition.

Further Binder Components

The above-mentioned binder systems (e.g. the non-aqueous dispersion binder system, the silylated acrylate binder system and the various hybrids) may have included therein—as a part of the binder system—one or more further binder components. It should be understood that the binder components mentioned below may alone also constitute the binder system, cf. the general presentation of the binder system.

Examples of such further binder components are: oils such as linseed oil and derivatives thereof, castor oil and derivatives thereof, soy bean oil and derivatives thereof; and other polymeric binder components such as saturated polyester resins; polyvinylacetate, polyvinylbutyrate, polyvinylchloride-acetate, co-polymers of vinyl acetate and vinyl isobutyl ether; vinylchloride; co-polymers of vinyl chloride and vinyl isobutyl ether; alkyd resins or modified alkyd resins; hydrocarbon resins such as petroleum fraction condensates; chlorinated polyolefines such as chlorinated rubber, chlorinated polyethylene, chlorinated polypropylene; styrene co-polymers such as styrene/butadiene co-polymers, styrene/methacrylate and styrene/acrylate co-polymers; acrylic resins such as homopolymers and co-polymers of methyl methacrylate, ethyl methacrylate, n-butyl methacrylate, isobutyl methacrylate and isobutyl methacrylate; hydroxy-acrylate co-polymers; polyamide resins such as polyamide based on dimerised fatty acids, such as dimerised tall oil fatty acids; cyclised rubbers; epoxy esters; epoxy urethanes; polyurethanes; epoxy polymers; hydroxypolyether resins; polyamine resins; etc., as well as co-polymers thereof.

Such further binder components typically constitutes 0-25%, such as 5-20%, by wet weight.

Biocides

The coating compositions of the present invention may comprise one or more biocides.

In the present context, the term "biocide" is intended to mean an active substance intended to destroy, deter, render harmless, prevent the action of, or otherwise exert a controlling effect on any harmful organism by chemical or biological means.

Such biocides may be selected from one or more of biocides.

Illustrative examples of non-metal biocides are those selected from heterocyclic nitrogen compounds such as 3a,4,7,7a-tetrahydro-2-((trichloromethyl)-thio)-1H-isoindole-1,3(2H)-dione, pyridine-triphenylborane, 1-(2,4,6-trichlorophenyl)-1H-pyrrole-2,5-dione, 2,3,5,6-tetrachloro-4-(methylsulfonyl)-pyridine, 2-methylthio-4-tert-butylamino-6-cyclopropylamine-s-triazin, and quinoline derivatives; heterocyclic sulfur compounds such as 2-(4-thiazolyl)-benzimidazole, 4,5-dichloro-2-n-octyl-4-isothiazolin-3-one, 4, 5-dichloro-2-octyl-3(2H)-isothiazoline (Sea-Nine©-211N), 1,2-benzisothiazolin-3-one, 2-(thiocyanatomethylthio)-benzothiazole, (RS)-4-[1-(2,3-dimethylphenyl)ethyl]-3H-imidazole (Medetomidine, Selektope®), and 4-Brom-2-(4-chlorphenyl)-5-(trifluormethyl)-H-pyrrol-3-carbonitril (Tralopyril, Econea®); urea derivatives such as N-(1,3-bis(hydroxymethyl)-2,5-dioxo-4-imidazolidinyl)-N,N'-bis(hydroxymethyl)urea, and N-(3,4-dichlorophenyl)-N,N-dimethylurea, N,N-dimethylchlorophenylurea; amides or imides of carboxylic acids; sulfonic acids and of sulfenic acids such as 2,4,6-trichlorophenyl maleimide, 1,1-dichloro-N-((dimethylamino)-sulfonyl)-1-fluoro-N-(4-methylphenyl)-methane-sulfenamide, 2,2-dibromo-3-nitrilo-propionamide, N-(fluorodichloromethylthio)-phthalimide, N,N-dimethyl-N'-phenyl-N'-(fluorodichloromethylthio)-sulfamide, and N-methylol formamide; salts or esters of carboxylic acids such as 2-((3-iodo-2-propynyl)oxy)-ethanol phenylcarbamate and N,N-didecyl-N-methyl-poly(oxyethyl)ammonium propionate; amines such as dehydroabiethylamines and cocodimethylamine; substituted methane such as di(2-hydroxyethoxy)methane, 5,5'-dichloro-2,2'-dihydroxydiphenylmethane, and methylene-bisthiocyanate; substituted benzene such as 2,4,5,6-tetrachloro-1,3-benzenedicarbonitrile, 1,1-dichloro-N-((dimethylamino)-sulfonyl)-1-fluoro-N- phenylmethanesulfenamide, and 1-((diiodomethyl)sulfonyl)-4-methyl-benzene; tetraalkyl phosphonium halogenides such as tri-n-butyltetradecyl phosphonium chloride; guanidine derivatives such as n-dodecylguanidine hydrochloride; disulfides such as bis-(dimethylthiocarbamoyl)-disulfide, tetramethylthiuram disulfide; imidazole containing compound, such as medetomidine; 2-(p-chlorophenyl)-3-cyano-4-bromo-5-trifluoromethyl pyrrole and mixtures thereof.

Currently preferred examples hereof are those selected from heterocyclic nitrogen compounds such as 4,5-dichloro-2-n-octyl-4-isothiazolin-3-one, 4,5-dichloro-2-octyl-3(2H)-isothiazoline (Sea-Nine®-211N), (RS)-4-[1-(2,3-dimethylphenyl)ethyl]-3H-imidazole (Medetomidine, Selektope®) and 4-Brom-2-(4-chlorphenyl)-5-(trifluormethyl)-1H-pyrrol-3-carbonitril (Tralopyril, Econea®);

Illustrative examples of metal-containing biocides are those selected from metal-containing organic biocides like metallo-dithiocarbamates (such as bis(dimethyldithiocarbamato)zinc, zinc-ethylenebis(dithiocarbamate) (Zineb), ethylene-bis(dithiocarbamato)manganese, dimethyl dithiocarbamate zinc, and complexes between these); bis(1-hydroxy-2(1H)-pyridinethionato-O,S)-copper (copper pyrithione); copper acrylate; bis(1-hydroxy-2(1H)-pyridinethionato-O,S)-zinc (zinc pyrithione); phenyl(bispyridyl)-bismuth dichloride; and metal-containing inorganic biocides like metal biocides such as copper(I)oxide, cuprous oxide, and metallic copper, copper metal alloys such as copper-nickel alloys like copper bronze; metal salts such as cuprous thiocyanate, basic copper carbonate, copper hydroxide, barium metaborate, copper chloride, silver chloride, silver nitrate and copper sulphide; and bis(N-cyclohexyl-diazenium dioxy) copper.

Currently preferred examples hereof are copper-containing biocides and zinc-containing biocides, in particular cuprous oxide, copper pyrithione, zinc pyrithione and zinc-ethylenebis-(dithiocarbamate) (Zineb).

Presently, it is preferred that the biocide (if present) does not comprise tin.

Currently preferred biocides are those selected from the group consisting of 2,4,5,6-tetra-chloroisophtalonitrile (Chlorothalonil), copper thiocyanate (cuprous sulfocyanate), N-dichloro-fluoromethylthio-N',N'-dimethyl-N-phenylsulfamide (Dichlofluanid), 3-(3,4-dichlorophenyl)-1,1-dimethylurea (Diuron), $N^2$-tert-butyl-$N^4$-cyclopropyl-6-methylthio-1,3,5-triazine-2,4-diamine (Cybutryne), 4-bromo-2-(4-chlorophenyl)-5-(trifluoromethyl)-1H-pyrrole-3-carbonitrile, (2-(p-chlorophenyl)-3-cyano-4-bromo-5-trifluoromethyl pyrrole; Tralopyril; $N^2$-tert-butyl-$N^4$-cyclopropyl-6-methylthio-1,3,5-triazine-2,4-diamine (Cybutryne), (RS)-4-[1-(2,3-dimethylphenyl)ethyl]-3H-imidazole (Medetomidine), 4,5-dichloro-2-n-octyl-4-isothiazolin-3-one (DCOIT, Sea-Nine® 211N), dichlor-N-((dimethylamino)sulfonyl)fluor-N-(p-tolyl)methansulfenamid (Tolylfluanid), 2-(thiocyanomethylthio)-1,3-benzothiazole ((2-benzothiazolylthio) methyl thiocyanate; TCMTB), triphenylborane pyridine (TPBP); bis(1-hydroxy-2(1H)-pyridinethionato-O,S)-(T-4) zinc (zinc pyridinethione; zinc pyrithione), bis(1-hydroxy-2(1H)-pyridinethionato-O,S)-T-4) copper (copper pyridinethione; copper pyrithione), zinc ethylene-1,2-bis-dithiocarbamate (zinc-ethylene-N—N'-dithiocarbamate; Zineb), copper(i) oxide, metallic copper, 3-(3,4-dichlorophenyl)-1,1-dimethylurea (Diuron) and diiodomethyl-p-tolylsulfone; Amical 48. Preferably at least one biocide is selected from the above list.

In a particularly preferred embodiment, the biocides are preferably selected among biocides which are effective against soft fouling such as slime and algae. Examples of such biocides are $N^2$-tert-butyl-$N^4$-cyclopropyl-6-methylthio-1,3,5-triazine-2,4-diamine (Cybutryne), 4,5-dichloro-2-n-octyl-4-isothiazolin-3-one (DCOIT, Sea-Nine® 211N), bis(1-hydroxy-2(1H)-pyridinethionato-O,S)-(T-4) zinc (zinc pyridinethione; zinc pyrithione), bis(1-hydroxy-2(1H)-pyridinethionato-O,S)-T-4) copper (copper pyridinethione; copper pyrithione; Copper Omadine) and zinc ethylene-1,2-bis-dithiocarbamate (zinc-ethylene-N—N'-dithiocarbamate; Zineb), copper(I) oxide, metallic copper, copper thiocyanate, (cuprous sulfocyanate), bis(1-hydroxy-2(1H)-pyridinethionato-O,S)-T-4) copper (copper pyridinethione; copper pyrithione; Copper Omadine).

In some embodiments, at least one biocide is an organic biocide. In a further particularly preferred embodiment, the one or more biocides are organic biocides, such as a pyrithione complex, such as zinc pyrithione, or such as copper pyrithione. Organic biocides are those either fully or in part being of organic origin.

In one important embodiment, the one or more biocides comprises at least one of bis(1-hydroxy-2(1H)-pyridinethionato-O,S)-(T-4) zinc (zinc pyridinethione; Zinc Pyrithione), bis(1-hydroxy-2(1H)-pyridinethionato-O,S)-(T-4) copper (copper pyridinethione; Copper Pyrithione) and zinc ethylene-1,2-bis-dithiocarbamate (zinc-ethylene-N—N'-dithiocarbamate; Zineb).

As detailed in U.S. Pat. No. 7,377,968, in those instances in which the biocide is depleted rapidly from the film due to e.g. a high water solubility or a high level of immiscibility with the matrix composition, it can be advantageous to add one or more of the biocide(s) in encapsulated form as a means of controlling the biocide dosage and extending the effective lifetime in the film. Encapsulated biocides can also be added if the free biocide alters the properties of the polysiloxane matrix in a way that is detrimental for its use as antifouling coatings (e.g. mechanical integrity, drying times, etc.).

In one embodiment, the biocide is encapsulated 4,5-dichloro-2-n-octyl-4-isothiazolin-3-one (Sea-Nine CR2).

The biocide preferably has a solubility in the range of 0-20 mg/L, such as 0.00001-20 mg/L, in water at 25° C.

Generally, the biocide is typically included in an amount of 3-65%, such as 5-60%, e.g. 10-60%, or 15-60%, or 15-40%, or 20-60%, by dry weight of the coating composition. Expressed as solids volume, the amount of the biocide is typically 3-45%, such as 5-40%, e.g. 7-38%, or 10-35%, or 15-35%, by solids volume of the coating composition.

In one particularly interesting embodiment, the biocide includes cuprous oxide. In this embodiment, the biocide is typically included in an amount of 3-65%, such as 5-60%, e.g. 10-60%, or 15-60%, or 15-40%, or 20-60%, by dry weight of the coating composition. Expressed as solids volume, the amount of the biocide is typically 3-45%, such as 5-40%, e.g. 7-38%, or 10-35%, or 15-35%, by solids volume of the coating composition.

In another particularly interesting embodiment, the biocide only includes organic biocides. In this embodiment, the organic biocide(s) is/are typically included in a total amount of 0.25-30%, such as 0.5-25%, e.g. 0.75-20%, or 1-15%, or even 2-12%, by dry weight of the coating composition. Expressed as solids volume, the amount of the organic biocide is typically 0.5-15%, such as 1-12%, e.g. 2-10%, or 4-9%, by solids volume of the coating composition.

It should be understood that the above embodiments may be views independently or in combination.

It should also be understood that the amounts provided as "by dry weight" or by "solids volume" applies equally for the antifouling coat defined herein.

Solvents, Additives, Pigments and Fillers

The coating compositions may further comprise solvents and additives.

The coating compositions described herein are preferably solvent-borne, hence comprises a solvent or a mixture of solvents. The solvents are preferably non-aqueous. Examples of solvents are aliphatic, cycloaliphatic and aromatic hydrocarbons such as white spirit, cyclohexane, methyl isobutyl ketone (MIBK), toluene, xylene and naphtha solvent, esters such as methoxypropyl acetate, n-butyl acetate and 2-ethoxyethyl acetate; octamethyltrisiloxane, and mixtures thereof.

In one embodiment, the solvents are selected from aliphatic, cycloaliphatic and aromatic hydrocarbons such as white spirit, cyclohexane, toluene, xylene and naphtha solvent, esters such as methoxypropyl acetate, n-butyl acetate and 2-ethoxyethyl acetate; octamethyltrisiloxane, and mixtures thereof, preferably those solvents having a boiling point of 110° C. or more.

In one embodiment, the solvent is xylene or MEK. In an embodiment, the solvent is xylene.

The solvent(s) typically constitute(s) 2-50% by volume of the coating composition, such as 3-40%, or 4-30%, or 5-25% by volume of the coating composition.

Examples of Additives are:

(i) non-reactive fluids such as organopolysiloxanes; for example polydimethylsiloxane, methylphenyl polysiloxane, and hydrophilic-modified polysiloxane oil (e.g. as disclosed in the section "Hydrophilic-modified polysiloxane oils" of WO 2013/000479); petroleum oils and combinations thereof;

(ii) surfactants such as derivatives of propylene oxide or ethylene oxide such as alkylphenol-ethylene oxide condensates (alkylphenol ethoxylates); ethoxylated monoethanolamides of unsaturated fatty acids such as ethoxylated monoethanolamides of linoleic acid; sodium dodecyl sulfate; and soya lecithin;

(iii) wetting agents and dispersants such as those described in M. Ash and I. Ash, "Handbook of Paint and Coating Raw Materials, Vol. 1", 1996, Gower Publ. Ltd., Great Britain, pp 821-823 and 849-851;

(iv) thickeners and anti-settling agents (e.g. thixotropic agents) such as colloidal silica, hydrated aluminium silicate (bentonite), aluminium tristearate, aluminium monostearate, xanthan gum, chrysotile, pyrogenic silica, hydrogenated castor oil, organo-modified clays, polyamide waxes and polyethylene waxes;

(v) dyes such as 1,4-bis(butylamino)anthraquinone and other anthraquinone derivatives; toluidine dyes, etc.; and (vi) antioxidants such as bis(tert-butyl) hydroquinone, 2,6-bis(tert-butyl) phenol, resorcinol, 4-tert-butyl catechol, tris(2,4-di-tert-butylphenyl)phosphite, pentaerythritol tetrakis(3-(3,5-di-tert-butyl-4-hydroxyphenyl)propionate), bis(2,2,6,6,-tetramethyl-4-piperidyl)sebacate, etc.

Any additives typically constitute 0-30%, such as 0-15%, by dry weight of the coating composition.

Preferably, the coating composition comprises one or more thickeners and/or anti-settling agents (e.g. thixotropic agents), preferably in an amount of 0.2-10%, such as 0.5-5%, e.g. 0.6-4%, by dry weight of the coating composition.

Furthermore, the coating composition used for forming the coat preferably comprises one or more selected from pigments and fillers.

Pigments and fillers are in the present context viewed in conjunction as constituents that may be added to the coating composition with only limited implications on the adhesion properties. "Pigments" are normally characterised in that they render the final paint coating non-transparent and non-translucent, whereas "fillers" normally are characterised in that they do not render the paint non-translucent and therefore do not contribute significantly to hide any material below the coating.

Examples of pigments are grades of titanium dioxide, red iron oxide, zinc oxide, carbon black, graphite, yellow iron oxide, red molybdate, yellow molybdate, zinc sulfide, antimony oxide, sodium aluminium sulfosilicates, quinacridones, phthalocyanine blue, phthalocyanine green, black iron oxide, indanthrone blue, cobalt aluminium oxide, carbazole dioxazine, chromium oxide, isoindoline orange, bisacetoacet-o-tolidiole, benzimidazolon, quinaphtalone yellow, isoindoline yellow, tetrachloroisoindolinone, quinophthalone yellow.

Examples of fillers are calcium carbonate such as calcite, dolomite, talc, mica, feldspar, barium sulfate, kaolin, nephelin, silica, perlite, magnesium oxide, and quartz flour, etc. Fillers (and pigments) may also be added in the form of nanotubes or fibres, thus, apart from the before-mentioned examples of fillers, the coating composition may also comprise fibres, e.g. those generally and specifically described in WO 00/77102 which is hereby incorporated by reference.

Any pigments and/or fillers typically constitute 0-60%, such as 0-50%, preferably 5-45%, such as 5-40%, or 5-35%, or 0.5-25%, or 1-20%, by dry weight of the coating composition. Taking into account the density of any pigments and/or fillers, such constituents typically constitute 0.2-20%, such as 0.5-15% by solids volume of the coating composition With the aim of facilitating easy application of the coating composition (e.g. by spray, brush or roller application techniques), the coating composition typically has a viscosity in the range of 25-25,000 mPa·s, such as in the range of 150-15,000 mPa·s, in particular in the range of 200-4,000 mPa·s.

It should be understood that the amounts provided as "by dry weight" or by "solids volume" applies equally for the antifouling coat defined herein.

Embodiments

In view of the above, the present invention provides a broad range of antifouling coating compositions (and corresponding antifouling coats), of which the following constitute currently preferred embodiments:

2-60%, such as 10-35%, by solids volume of one or more carbon-based hydrolysable polymers comprising monomers of general formula I (as defined herein);

2-60%, such as 10-35%, by solids volume of one or more further binder components;

0.5-10%, such as 3-7%, by solids volume of non biocidal additives;

2-40%, such as 5-35%, by solids volume of non biocidal pigments and/or fillers; and 2-40%, such as 5-35%, by solids volume of biocides.

In the above embodiment, the monomer of the general formula I typically constitutes 5-100% by weight of the polymer.

2-60%, such as 10-35%, by solids volume of one or more carbon-based hydrolysable polymers comprising monomers selected from one or more selected from IPGA, IPGMA, iPGEOA and iPGEOMA (as defined herein);

2-60%, such as 10-35%, by solids volume of one or more further binder components;

0.5-10%, such as 3-7%, by solids volume of non biocidal additives;

2-40%, such as 5-35%, by solids volume of non biocidal pigments and/or fillers; and 2-40%, such as 5-35%, by solids volume of biocides.

In the above embodiment, the IPGA, IPGMA, iPGEOA and iPGEOMA monomers typically constitutes 5-100% by weight of the polymer.

2-60%, such as 10-35%, by solids volume of one or more carbon-based hydrolysable polymers comprising monomers selected from one or more selected from GCA and GCMA (as defined herein);

2-60%, such as 10-35%, by solids volume of one or more further binder components;

0.5-10%, such as 3-7%, by solids volume of non biocidal additives;

2-40%, such as 5-35%, by solids volume of non biocidal pigments and/or fillers; and 2-40%, such as 5-35%, by solids volume of biocides.

In the above embodiment, the GCA and GCMA monomers typically constitutes 5-100% by weight of the polymer.

In an embodiment, the herein disclosed antifouling coating compositions comprises a rosin based binder system. In a further embodiment, the herein disclosed antifouling coating compositions comprises rosin and/or rosin derivatives. In yet an embodiment, the herein disclosed antifouling coating compositions comprises gum rosin, hydrogenated rosin and/or disproportionated rosin. In yet an embodiment, the herein disclosed antifouling coating compositions comprises gum rosin. In an embodiment, the rosin based binder system constitutes 5-30% by dry weight of the coating composition.

Novel Carbon-Based Hydrolysable Polymers

It is believed that some of the polymers described hereinabove are novel per se. Hence, the present invention also provides a carbon-based hydrolysable polymer of ethylenically unsaturated monomers, wherein said monomers including at least one monomer of the general formula I:

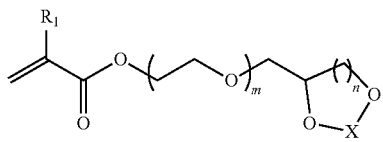

wherein m is 0-50, n is 1-3, $R_1$ is selected from hydrogen and methyl, and X is selected from $>C=O$ or $>C(R_2)(R_3)$, where $R_2$ and $R_3$ are independently selected from hydrogen and $C_{1-20}$-alkyl, and aryl, and optionally one or more further ethylenically unsaturated monomers, in particular one or more (meth)acrylate monomers, in particular including at least one or more selected from methyl (meth)acrylate (MA/MMA), methoxy ethyl (meth)acrylate (MOXEA/MOXEMA), butyl (meth)acrylate (BA/BMA), styrene, tri-isopropylsilyl(meth)acrylate TiPS(M)A and (meth)acrylic acid (AAc/MAAc).

In some embodiments, the polymer is a homopolymer.

In other embodiments, the polymer (then referred to as a co-polymer) is made up of two or more different monomers, e.g. different monomers or general formula I or one or more monomers of general formula I and one or more other ethylenically unsaturated monomers.

Such novel co-polymers are made up of one or more ethylenically unsaturated monomers other than those of general formula I, e.g. those selected from acrylic acid, methacrylic acid, (meth)acrylates such as methyl (meth)acrylate (MMA), ethyl (meth)acrylate, propyl (meth)acrylate, isopropyl (meth)acrylate, butyl (meth)acrylate, isobutyl (meth)acrylate, tert-butyl (meth)acrylate, pentyl (meth)acrylate, hexyl (meth)acrylate, cyclohexyl (meth)acrylate, octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate, stearyl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, 2-hydroxy-3-phenoxypropyl (meth)acrylate, 2-methoxyethyl acrylate (MOXEA), 2-methoxyethyl methacrylate (MOXEMA), 2-ethoxymethyl (meth)acrylate, 4-methoxybutyl (meth)acrylate, methoxypropyl (meth)acrylate, propoxyethylethyl (meth)acrylate, 2-butoxyethyl (meth)acrylate, isobutoxyethyl (meth)acrylate, isobutoxybutyl diglycol (meth)acrylate, triisopropylsilyl(meth)acrylate (TiPS(M)A) and phenoxyethyl (meth)acrylate; multifunctional (meth)acrylates such as tetraethylene glycol diacrylate, tripropylene glycol diacrylate, 1,3-butanediol di(meth)acrylate, 1,4-butanediol di(meth)acrylate, 1,6-hexanediol diacrylate, ethylene glycol dimethacrylate, trimethylolpropane triacrylate, trimethylolpropane trimethacrylate, di(trimethylolpropane) tetraacrylate, pentaerythritol triacrylate, pentaerythritol tetraacrylate, and dipentaerythritol pentaacrylate; and vinyl monomers such as vinyl acetate, isobutyl vinyl ether, styrene, vinyl toluene, (meth)acrylonitrile, and vinyl propionate.

The embodiments described above under the section "The carbon-based hydrolysable polymers" also apply for the novel (co-)polymers.

In some embodiments, the weight average molecular weight ($M_w$) of the polymer is 2-500 kDa, such as 5-200 kDa, or 10-100 kDa.

In one embodiment, the polymer (which is particularly useful in the antifouling coating composition, etc.) is a ter-polymer of MOXEA, MMA and one of IPGA/IPGMA, iPGEOA/iPGEOMA and GCA/GCMA, e.g. a ter-polymer having the following approximate proportions of monomers from 5:25:70 to 15:15:70 to 10:40:50, such as having the following weight ratio of monomers from 5:25:70 to 15:15:70 to 10:40:50.

In another embodiment, the polymer (which is particularly useful in the antifouling coating composition, etc.) is a ter-polymer of TiPSA, one or more of IPG/IPGMA, iPGEOA/iPGEOMA and GCA/GCMA, and one or more other (meth)acrylic monomer(s) (like MMA), e.g. a ter-polymer having the following approximate proportions of monomers from 10:20:70 to 30:20:50 to 20:20:60, such as having the following weight ratio of monomers from 10:20:70 to 30:20:50 to 20:20:60.

In still other embodiment, the polymer (which is particularly useful in the antifouling coating composition, etc.) is a bis-polymer of MMA and one of IPGA/IPGMA, iPGEOA/iPGEOMA and GCA/GCMA, e.g. a bis-polymer having the following approximate proportions of monomers from 20:80 to 80:20, such as having the following weight ratio of monomers from 20:80 to 80:20.

In still other embodiment, the polymer (which is particularly useful in the antifouling coating composition, etc.) is a bis-polymer of TIPSA and one of IPGA/IPGMA, iPGEOA/iPGEOMA and GCA/GCMA, e.g. a bis-polymer having the following approximate proportions of monomers from 20:80 to 80:20, such as having the following weight ratio of monomers from 20:80 to 80:20.

Preparation of Polymers

The (co-)polymers generally described herein (including the novel polymers described in the previous section) which are useful for the coating compositions described herein may be prepared according to conventional free radical polymerisation procedures for preparing polymers of ethylenically unsaturated monomers.

Antifouling Coat

A further aspect of the present invention is an antifouling coat (occasionally referred to as a "paint coat" or a "coating") corresponding to the antifouling coating composition. The constituents are as defined further above for the coating composition, and any descriptions, preferences and variants also apply for the coat which simply represents the coating composition when allowed to dry.

In one embodiment, the antifouling coat comprises a polymer of ethylenically unsaturated monomers, said monomers including at least one monomer of the general formula I as defined herein, and one or more pigments and fillers.

In some embodiments, the polymer constitutes 2-60% by solids volume of the coat, and the one or more pigments and fillers constitute 5-45% by solids volume of the coat.

In still another embodiment, the coat comprises 2-35, such as 3-30, in particular 4-25, g/m$^2$ of said one or more biocides.

Preparation of Coating Composition

The antifouling coating composition is used to prepare a corresponding antifouling coat.

The coating compositions may be prepared by any suitable technique that is commonly used within the field of paint production. Thus, the various constituents may be mixed together utilizing a mixer, a high speed disperser, a ball mill, a pearl mill, a grinder, a three-roll mill etc. The coating compositions are typically prepared and shipped as one or two-component systems that should be combined and thoroughly mixed immediately prior to use. The paints according to the invention may be filtrated using bag filters, patron filters, wire gap filters, wedge wire filters, metal edge filters, EGLM turnoclean filters (ex. Cuno), DELTA strain filters (ex. Cuno), and Jenag Strainer filters (ex. Jenag), or by vibration filtration. An example of a suitable preparation method is described in the Examples.

Application of the Coating Composition

The coating composition of the invention is typically applied to at least a part of the surface of a substrate.

The term "applying" is used in its normal meaning within the paint industry. Thus, "applying" is conducted by means of any conventional means, e.g. by brush, by roller, by spraying, by dipping, etc. The commercially most interesting way of "applying" the coating composition is by spraying. Hence, the coating composition is preferably sprayable. Spraying is effected by means of conventional spraying equipment known to the person skilled in the art. The coating is typically applied in a dry film thickness of 50-600 µm, such as 50-500 µm, e.g. 75-400 µm, or 20-150 µm, or 30-100 µm.

Moreover, the coating composition is preferably such with respect to sag resistance cf. ASTM D 4400-99 (i.e. relating to its ability to be applied in a suitable film thickness to a vertical surface without sagging) that it exhibits sag resistance for a wet film thickness up to at least 70 µm, such as up to at least 200 µm, e.g. up to at least 300 µm, preferably up to at least 400 µm, and in particular up to at least 600 µm.

The term "at least a part of the surface of a substrate" refers to the fact that the coating composition may be applied to any fraction of the surface. For many applications, the coating composition is at least applied to the part of the substrate (e.g. a vessel) where the surface (e.g. the ship's hull) may come in contact with water, e.g. sea-water.

The term "substrate" is intended to mean a solid material onto which the coating composition is applied. The substrate typically comprises a metal such as steel, iron, aluminium, or glass-fibre reinforced polyester. In the most interesting embodiments, the substrate is a metal substrate, in particular a steel substrate. In an alternative embodiment, the substrate is a glass-fibre reinforced polyester substrate. In some embodiments, the substrate is at least a part of the outermost surface of a marine structure.

The term "surface" is used in its normal sense, and refers to the exterior boundary of an object. Particular examples of such surfaces are the surface of marine structures, such as vessels (including but not limited to boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, floatation devices, water-power installations and structures, underwater oil well structures, nets and other aquatic culture installations, cooling plants, and buoys, etc., and is especially applicable to the hulls of ships and boats and to pipes.

The surface of the substrate may either be the "native" surface (e.g. the steel surface or a composite structure). However, the substrate is typically coated, e.g. with an anticorrosive coating and/or a tie coat, so that the surface of the substrate is constituted by such a coating. When present, the (anticorrosive and/or tie) coating is typically applied in a total dry film thickness of 100-600 µm, such as 150-450 µm, e.g. 200-400 µm. Alternatively, the substrate may carry a paint coat, e.g. a worn-out antifouling paint coat, or similar.

In one important embodiment, the substrate is a metal substrate (e.g. a steel substrate) coated with an anticorrosive coating such as an anticorrosive epoxy-based coating, e.g. cured epoxy-based coating, or a shop-primer, e.g. a zinc-rich shop-primer. In another relevant embodiment, the substrate is a glass-fiber reinforced polyester substrate coated with an epoxy primer coating.

The coating composition is typically applied as the outermost coat (a.k.a. a top-coat), i.e. the coat being exposed to the environment, e.g. an aquatic environment. However, it should be understood that the coating composition alternatively may be applied as a layered system where the coating composition will be coated with one or more layer(s) of one or more other coating compositions in order to obtain an improved control of the leaching rate of the leachable components in the coat.

Prior to the application of a coating composition to a marine structure, the marine structure may first be coated with a primer-system which may comprise several layers and may be any of the conventional primer systems used in connection with application of coating compositions to marine structures. Thus, the primer system may include an anti-corrosive primer optionally followed by a layer of an adhesion-promoting primer.

This being said, the invention also relates to a method of establishing an antifouling coating system on a surface of a substrate, comprising the sequential steps of:

a) applying one or more layers of a primer composition onto the surface of said substrate, thereby forming a primed substrate, b) applying one or more layers of the coating composition as defined hereinabove onto the surface of said primed surface, and allowing said layer(s) to dry/cure, thereby forming an antifouling coat as defined hereinabove.

In some variants of the above-mentioned method, the antifouling coat may be further coated with a top-coat.

A Marine Structure

The present invention further provides a marine structure comprising on at least a part of the outer surface thereof an outermost antifouling coat as defined hereinabove under the section "Antifouling coat". In particular, at least as part of the outer surface carrying the outermost coating is a submerged part of said structure.

The coating composition, the method of establishing the coating on the substrate surface, and the characteristics of the coating follow the directions given hereinabove.

In one embodiment, the antifouling coating system of the marine structure may consist of an anticorrosive layer and the antifouling coating system as described herein.

In an alternative embodiment, the antifouling coating composition is applied on top of a used antifouling coating system, e.g. on top of a used antifouling coat.

In one particular embodiment of the above marine structure, the anticorrosive layer has a total dry film thickness of 100-600 µm, such as 150-450 µm, e.g. 200-400 µm; and the antifouling coating has a total dry film thickness of 20-500 µm, such as 20-400 µm, e.g. 50-300 µm.

A further embodiment of the marine structure is that where at least a part of the outermost surface of said structure is coated with an antifouling coating system comprising a total dry film thickness of 150-400 µm of an anticorrosive layer of an epoxy-based coating established by application of 1-4, such as 2-4, layers; and a total dry film thickness of 20-400 µm of the antifouling coat established by application of 1-2 layers of the coating composition as defined hereinabove.

Uses

A further aspect of the invention relates to the use of the particular polymers defined hereinabove as a co-binder for improving the antifouling properties of a coating composition comprising an erodible binder system.

The nature of the constituents are described in the above sections, "The binder system", "Biocides", "Solvents, additives, pigments and fillers", etc.

Further embodiments disclosed herein is:

Embodiment 1. An antifouling coating composition comprising a polymer of ethylenically unsaturated monomers, said monomers including at least one monomer of the general formula I:

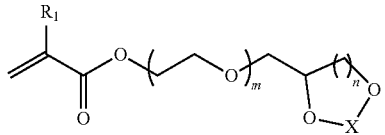

wherein m is 0-50, n is 1-3, $R_1$ is selected from hydrogen and methyl, and X is selected from $>C=O$ or $>C(R_2)(R_3)$, where $R_2$ and $R_3$ are independently selected from hydrogen, $C_{1-20}$-alkyl and aryl.

Embodiment 2. The antifouling coating composition according to embodiment 1, further comprising a rosin based binder system.

Embodiment 3. The antifouling coating composition according to any one of embodiments 1 or 2, comprising rosin and/or rosin derivatives.

Embodiment 4. The antifouling coating composition according to any one of the preceding embodiments comprising gum rosin, hydrogenated rosin and/or partially hydrogenated rosin.

Embodiment 5. The antifouling coating composition according to any one of the preceding embodiments, further comprising gum rosin.

Embodiment 6. The antifouling coating composition according to any one of the preceding embodiments, wherein the rosin based binder system constitutes 5-30% by dry weight of the coating composition.

Embodiment 7. The antifouling coating composition according to any one of the preceding embodiments, wherein m is 0 or 5.

Embodiment 8. The antifouling coating composition according to any one of the preceding embodiments, wherein m is 1-12.

Embodiment 9. The antifouling coating composition according to any one of the preceding embodiments, wherein m is 1-6.

Embodiment 10. The antifouling coating composition according to any one of the preceding embodiments, wherein n is 1-3.

Embodiment 11. The antifouling coating composition according to any one of the preceding embodiments, wherein n is 1 or 2.

Embodiment 12. The antifouling coating composition according to any one of the preceding embodiments, wherein n is 1.

Embodiment 13. The antifouling coating composition according to any one of the preceding embodiments, wherein X is $>C=O$.

Embodiment 14. The antifouling coating composition according to any one of the preceding embodiments, wherein X is $>C(R_2)(R_3)$, wherein $R_2$ and $R_3$ both are methyl.

Embodiment 15. The antifouling coating composition according to any one of the preceding embodiments, wherein the monomer of formula I is at least one of (2,2-dimethyl-1,3-dioxolan-4-yl)methyl (meth)acrylate (IPGA/IPGMA), isopropylidene glycerol ethoxylated (meth)acrylate (iPGEO(M)A) and (2-oxo-1,3-dioxolan-4-yl)methyl (meth)acrylate (GCA/GCMA).

Embodiment 16. The antifouling coating composition according to any one of the preceding embodiments, wherein the monomers of formula I in total constitutes 5-100% by weight of the polymer.

Embodiment 17. The antifouling coating composition according to any one of the preceding embodiments, wherein the monomer of formula I is at least one of (2,2-dimethyl-1,3-dioxolan-4-yl)methyl (meth)acrylate (IPGA/IPGMA), and isopropylidene glycerol ethoxylated (meth)acrylate (iPGEO(M)A).

Embodiment 18. The antifouling coating composition according to any one of the preceding embodiments, wherein the monomer of formula I is at least one of (2,2-dimethyl-1,3-dioxolan-4-yl)methyl methacrylate (IPGMA), isopropylidene glycerol ethoxylated methacrylate (iPGEOMA) and (2-oxo-1,3-dioxolan-4-yl)methyl acrylate (GCA).

Embodiment 19. The antifouling coating composition according to any one of the preceding embodiments, wherein the monomer of formula I is (2,2-dimethyl-1,3-dioxolan-4-yl)methyl methacrylate (IPGMA).

Embodiment 20. The antifouling coating composition according to any one of the preceding embodiments, wherein the monomer of formula I is (2,2-dimethyl-1,3-dioxolan-4-yl)methyl acrylate (IPGA).

Embodiment 21. The antifouling coating composition according to any one of the preceding embodiments, wherein the monomer of formula I is isopropylidene glycerol ethoxylated methacrylate (iPGEOMA).

Embodiment 22. The antifouling coating composition according to any one of the preceding embodiments, wherein the monomer of formula I is isopropylidene glycerol ethoxylated acrylate (iPGEOA).

Embodiment 23. The antifouling coating composition according to any one of the preceding embodiments, wherein the monomer of formula I is (2-oxo-1,3-dioxolan-4-yl)methyl methacrylate (GCMA).

Embodiment 24. The antifouling coating composition according to any one of the preceding embodiments, wherein the monomer of formula I is (2-oxo-1,3-dioxolan-4-yl)methyl acrylate (GCA).

Embodiment 25. The antifouling coating composition according to any one of the preceding embodiments, wherein the ethylenically unsaturated monomer(s) other than those of general formula I are selected from (meth) acrylates.

Embodiment 26. The antifouling coating composition according to any one of the preceding embodiments, wherein the ethylenically unsaturated monomer(s) other than those of general formula I are selected from methyl (meth)acrylate (MA/MMA), methoxy ethyl (meth)acrylate (MOXEA/MOXEMA), butyl (meth)acrylate (BA/BMA), styrene, triisopropylsilyl(meth)acrylate (TiPS(M)A) and (meth)acrylic acid (AAc/MAAc).

Embodiment 27. The antifouling coating composition according to any one of the preceding embodiments, wherein the ethylenically unsaturated monomer(s) other than those of general formula I are selected from methyl methacrylate (MMA), methoxy ethyl acrylate (MOXEA), and triisopropylsilylacrylate (TiPSA).

Embodiment 28. The antifouling coating composition according to any one of the preceding embodiments, wherein the ethylenically unsaturated monomer(s) other than those of general formula I are methyl methacrylate (MMA) optionally in combination with methoxy ethyl acrylate (MOXEA) and/or triisopropylsilylacrylate (TiPSA).

Embodiment 29. The antifouling coating composition according to any one of the preceding embodiments, wherein the polymer has a molar ratio of monomers of general formula I to other ethylenically unsaturated monomers of 20:80 to 80:20.

Embodiment 30. The antifouling coating composition according to any one of the preceding embodiments, wherein the polymer is a ter-polymer of MOXEA, MMA and one of IPGA/IPGMA, iPGEOA/iPGEOMA and GCA/GCMA.

Embodiment 31. The antifouling coating composition according to any one of the preceding embodiments, wherein the polymer is a ter-polymer of TIPSA, MMA and one of IPGA/IPGMA, iPGEOA/iPGEOMA and GCA/GCMA.

Embodiment 32. The antifouling coating composition according to any one of the preceding embodiments, wherein the polymer is a bis-polymer of MMA and one of IPGA/IPGMA, iPGEOA/iPGEOMA and GCA/GCMA.

Embodiment 33. The antifouling coating composition according to any one of the preceding embodiments, wherein the monomers of general formula I in total constitute 25-95% by weight of the polymer.

Embodiment 34. The antifouling coating composition according to any one of the preceding embodiments, wherein the monomers of general formula I in total constitute 30-70% by weight of the polymer.

Embodiment 35. The antifouling coating composition according to any one of the preceding embodiments, wherein the monomers (2,2-dimethyl-1,3-dioxolan-4-yl) methyl (meth)acrylate (IPGA/IPGMA) and/or isopropylidene glycerol ethoxylated (meth)acrylate (iPGEO(M)A) in total constitute 25-95% by weight of the polymer, such as 30-70% by weight of the polymer.

Embodiment 36. The antifouling coating composition according to any one of the preceding embodiments wherein the ethylenically unsaturated monomer(s) other than those of general formula I in total constitute 5-75% by weight of the polymer, such as 30-70% by weight of the polymer.

Embodiment 37. The antifouling coating composition according to any one of the preceding embodiments wherein the ethylenically unsaturated monomer(s) other than those of general formula I are selected from (meth)acrylates and constitute in total 5-75% by weight of the polymer, such as 30-70% by weight of the polymer.

Embodiment 38. The antifouling coating composition according to any one of the preceding embodiments wherein the ethylenically unsaturated monomer(s) other than those of general formula I are selected from one or more of methyl methacrylate (MMA), methoxy ethyl acrylate (MOXEA), and triisopropylsilylacrylate (TiPSA) and constitute in total 5-75% by weight of the polymer, such as 30-70% by weight of the polymer.

Embodiment 39. The antifouling coating composition according to any one of the preceding embodiments, wherein the polymer constitutes 2-60% by solids volume of the coating composition.

Embodiment 40. The antifouling coating composition according to any one of the preceding embodiments, wherein the coating composition as a part of the binder system further comprises as a co-binder a silylated acrylate co-polymer having at least one side chain bearing at least one terminal group of the general formula (A):

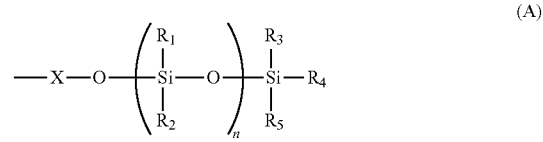

(A)

wherein n is an integer of 0-100, X is —C(=O)—, and $R_1$, $R_2$, $R_3$, $R_4$ and $R_5$ are each independently selected from $C_{1-20}$-alkyl and optionally substituted aryl.

Embodiment 41. The antifouling coating composition according to any one of the preceding embodiments, wherein the coating composition further comprises as a co-binder a non-aqueous dispersion binder component, wherein said binder component comprises a resin having a core-shell structure which is constituted of (a) a hydrophilic core component comprising a polymer of ethylenically unsaturated monomers, and (b) a shell component comprising a polymer of ethylenically unsaturated monomers.

Embodiment 42. The antifouling coating composition according to any one of the preceding embodiments, which exhibits a polishing rate of at least 0.5 μm per 10,000

Nautical Miles as determined in accordance with the Polishing Rate Test defined herein.

Embodiment 43. An antifouling coat comprising a polymer of ethylenically unsaturated monomers, said monomers including at least one monomer of the general formula I:

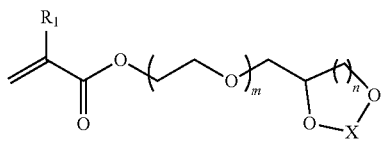

wherein m is 0-50, n is 1-3, $R_1$ is selected from hydrogen and methyl, and X is selected from $>C=O$ or $>C(R_2)(R_3)$, where $R_2$ and $R_3$ are independently selected from hydrogen, $C_{1-20}$-alkyl and aryl, and one or more pigments and fillers.

Embodiment 44. The antifouling coat according to embodiment 43, wherein the polymer constitutes 2-60% by solids volume of the coat and wherein the one or more pigments and fillers constitute 5-45% by solids volume of the coat.

Embodiment 45. A marine structure comprising on at least a part of the outer surface thereof an outermost antifouling coat as defined in any one of the embodiments 43-44.

Embodiment 46. The use of one or more polymer(s) of ethylenically unsaturated monomers, said monomers including at least one monomer of the general formula I:

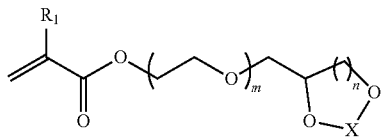

wherein m is 0-50, n is 1-3, $R_1$ is selected from hydrogen and methyl, and X is selected from $>C=O$ or $>C(R_2)(R_3)$, where $R_2$ and $R_3$ are independently selected from hydrogen, $C_{1-20}$-alkyl and aryl, as a co-binder for improving the antifouling properties of a coating composition comprising an erodible binder system.

General Remarks

Although the present description and claims occasionally refer to a binder, a biocide, etc., it should be understood that the coating compositions defined herein may comprise one, two or more types of the individual constituents. In such embodiments, the total amount of the respective constituent should correspond to the amount defined above for the individual constituent.

The "(s)" in the expressions: compound(s), agent(s), etc. indicates that one, two or more types of the individual constituents may be present.

On the other hand, when the expression "one" is used, only one (1) of the respective constituent is present.

It should be understood that when reference is made to the coating composition, it is the mixed coating composition. Furthermore all amounts stated as % by solids volume of the coating should be understood as % by solids volume of the mixed coating composition (or the final coat) unless stated otherwise.

It should be understood that the expression "% dry weight" means the percentage of the respective component based on the dry weight of the coat or of the coating composition, as the case may be. For most practical purposes (hence, unless otherwise stated), the "% dry weight" when referring the final coat is identical to the "% dry weight" of the coating composition.

EXAMPLES

Materials
Ethylenically Unsaturated Monomers:
MMA; Methylmethacrylate ex Sigma Aldrich (US)
iPGMA; isopropylidene glycerol methacrylate ex GEO Specialty Chemicals (UK)
iPGEOMA; isopropylidene glycerol Ethoxylated (EO5) methacrylate ex GEO Specialty Chemicals (UK)
MOXEA; 2-Methoxyethyl acrylate ex Sigma Aldrich (US)
GCA; Glycerol carbonate acrylate ex BASF (Germany)
GCMA; Glycerol carbonate methacrylate ex BASF (Germany)
TIPSA; triisopropylsilylacrylate ex Yuki Gosei (Japan)
Binders:
Chinese Gum Rosin ex. Arawaka Chemical Industries, (China), Gum Rosin
Hypale CH ex. Arakawa Chemical Industries (China)
Foral AX-E, ex Eastman Chemicals (Netherlands), Hydrogenated rosin
NSP-100 ex Nitto Kasei, (Japan), 50 wt. % solution xylen/ethylbenzene (1:1), Silylated acrylic co-polymer binder solution
Plasticizer; 45 wt. % solution in xylene,
Biocides:
Nordox Cuprous Oxide Paint Grade, ex Nordox, (Norway), cuprous oxide
Copper Omadine ex Arch Chemicals, (China), copper pyrithione
Solvents:
Xylene
MIBK; methyl isobutyl ketone
MEK; Methyl ethyl ketone
Additives:
Thickener:
Bentone 38 ex Elementis Specialties, (United Kingdom)
Wetting Agents:
Nuosperse 657 RD ex Elementis Specialties (Netherlands)
Disperbyk 164 ex BYK Chemie, (Germany)
Anti-Gelling Agents:
DTBHQ ex Hangzhou Thomas (China), 2,5-diterbutyl hydroquinone
Thixotropic Agents:
Aditix M 60 ex Supercolori (Italy), Modified polyethylene wax
Dehydrating Agents:
TES28 ex Waker Chemie (Germany)
AiBN; Azobisisobutyronitrile
Pigments and Fillers:
Zinc Oxide Red Seal ex Umicore (Netherlands)
Kronos 2310 ex Kronos Titan A/S, (Germany), titanium dioxide
Iron oxide pigment; Micronox R01 ex Promindsa (Spain)
Casiflux F75 ex Ankerpoort (Netherlands), Natural calcium silicate Rockforce®MS603-Roxul® 1000 ex Lapinus Fibres BV (Netherlands), Man-made vitreous fibres
Methods
MW/Mn/PDI Measurement
Molecular weight and polydispersity of the polymers were measured by Gel permeation chromatography (GPC)

analyses carried out with Styragel (300*7.8 mm, 5 µm nominal particle size) Waters columns.

DMF/LiBr (0.1% v/v) was used as a solvent. Measurements were performed at 35° C. (70° C.) at a flow rate of 1 mL/min (0.7) using a RI detector. Molecular weights of polymers were referenced to PS standards.

Tg Measurement

Glass transition temperatures of the samples were determined using a DSC7 calorimeter of Perkin Elmer. The heating rate was 10° C./min. Tg value is the temperature at the half-height of the heat capacity increase.

Polishing Rate Test

Polishing and leaching characteristics are measured using a rotary set-up similar to the one described by Kiil et al. (Kiil, S, Weinell, C E, Yebra, D M, Dam-Johansen, K, "Marine biofouling protection: design of controlled release antifouling paints." In: Ng, K M, Gani, R, Dam-Johansen, K (eds.) Chemical Product Design; Towards a Perspective Through Case Studies, 23IDBN-13: 978-0-444-52217-7. Part II (7), Elsevier (2006)). The set-up consists of a rotary rig, which has two concentric cylinders with the inner cylinder (rotor, diameter of 0.3 m and height 0.17 m) capable of rotation. The cylinder pair is immersed in a tank containing about 400-500 litres of Artificial Seawater (cf. Table 1).

TABLE 1

Composition of Artificial Seawater

| Salt | Concentration in g/L |
| --- | --- |
| NaCl | 32 |
| MgSO$_4$•7H$_2$O | 14 |
| NaHCO$_3$ | 0.2 |

The tank is fitted with baffles to break the liquid flow, which enhances turbulence and enables faster mixing of the species released from the paints and enhance heat transfer from a thermostating system. The purpose of using two cylinders is to create a close approximation to couette flow (flow between two parallel walls, where one wall moves at a constant velocity). The rotor is operated at 20 knots at 25° C. (unless otherwise specified), and the pH is adjusted frequently to 8.2 using 1 M sodium hydroxide or 1 M hydrochloric acid.

Samples are prepared using overhead transparencies (3M PP2410) that are primed using two-component paint (Hempadur 47182 ex Hempel) applied using a Doctor Blade applicator with a gap size of 200 µm. Coating samples are applied adjacent to each other using a Doctor Blade applicator with a gap of 250 µm. After drying for 1 day, the coated transparency is cut in strips of 2 cm resulting in eight samples of 1.5×2 cm$^2$ on a long (21 cm) strip. The strips are mounted on the rotor, and left to dry for a week.

The laboratory rotors are operating at 25 knots, 25° C. and 100% activity. After one week, the test is initiated, and during the experiment, samples are removed after 60, 120 and 180 days in order to inspect the polishing and leaching depths. The samples are dried for three days at ambient conditions, after which they are cut in half and cast in paraffin. The internal front of the sample is planed off before total film thickness and leached layer thickness is established using light microscopy (coating cross-section inspection).

The values of polishing measured are expressed in the Tables as microns/10000 Nautical miles after 120 days.

Antifouling Property Test

An acrylic test panel (15×20 cm$^2$), sandblasted on one side to facilitate adhesion of the coating, is first coated with 80 µm (DFT) of a commercial chlorinated rubber primer (Hempatex 46330 ex Hempel) applied by air spraying. After a minimum drying time of 24 hours in the laboratory at room temperature the test paint is applied with a Doctor Blade type applicator, with four gap sizes with a film width of 80 mm. One coat was applied in a DFT of 90-100 µm. After at least 72 hours drying the test panels are fixed on a rack and immersed in sea water.

Test at Vilanova i La Geltrú in Northeastern Spain

In this test site the panels are immersed in seawater with salinity in the range of 37-38 parts per thousand at an average temperature in the range of 17-18° C. Every 1-12 weeks, inspection of the panels is made and the antifouling performance is evaluated according to the scale shown in Table 2. One score is given for the total fouling of the types: algae and animals.

Test at Singapore

In this test site the panels are immersed in seawater with salinity in the range of 29-31 parts per thousand at a temperature in the range of 29-31° C. Every 1-12 weeks, inspection of the panels is made and the antifouling performance is evaluated according to the scale shown in Table 2. One score is given for the total fouling of the types: algae and animals.

TABLE 2

Scale for grading the performance of coatings undergoing static antifouling testing

| Score | Fouled area (%) |
| --- | --- |
| Very Poor | 91-100% fouling |
| Poor | 71-90% fouling |
| Fair | 51-70% fouling |
| Good | 31-50% fouling |
| Very Good | 11-30% fouling |
| Excellent | 0-10% fouling |

Preparation of Coating Compositions for Text Examples

The coating compositions (see the tables further below) are prepared following the standard procedure. An initial dispersion of the binder(s) in organic solvent, followed by addition of part or all the additives such as thixotropic agents, etc., and eventually the addition of part or all the pigments such as zinc oxide, fibres, etc. are mixed on a Diaf dissolver equipped with an impeller disc. Further, the rest of the pigments such as cuprous oxide, zinc-ethylenebis(dithiocarbamate) (Zineb) is added, and a temperature activation of any component that may require it (e.g. thixotropic agent) is initiated. The coating compositions are finally let down with the remaining additives and binders, and its rheology adjusted with final addition of remaining organic solvent.

Typically, the solid components of the coating composition are mixed and ground.

The coating composition may be prepared as a one component paint or by mixing two or more components e.g. two pre-mixtures, one pre-mixture comprising the one or more resins and one pre-mixture comprising the one or more curing agents.

It should be understood that the expression "% dry weight" means the percentage of the respective component based on the dry weight of the coat or of the coating composition, as the case may be. For most practical purposes (hence, unless otherwise stated), the "% dry weight" when referring the cured coat is identical to the "% dry weight" of the coating composition.

Working Examples

Preparation of Co-polymers

Abbreviations Used in Examples

MMA=Methylmethacrylate
iPGMA=isopropylidene glycerol methacrylate
iPGEOMA=isopropylidene glycerol Ethoxylated (E05) methacrylate
MOXEA=2-Methoxyethyl acrylate
MEK=Methyl ethyl ketone
GCA=Glycerol carbonate acrylate
AiBN=Azobisisobutyronitrile
TiPSA=triisopropylsilylacrylate Preparation of Co-Polymer A
Polymer: MMA/iPGMA/MOXEA: 37.0/56.0/7.0
Xylene: 98.8% on total monomer
AiBN: 1.21% on total monomer
Composition:

| No. | Component | Amount/g |
|---|---|---|
| 1 | Xylene | 103.20 |
| 2 | MMA | 55.50 |
| 3 | iPGMA | 84.00 |
| 4 | MOXEA | 10.50 |
| 5 | Xylene | 30.00 |
| 6 | AiBN | 1.52 |
| 7 | Xylene | 15.00 |
| 8 | AiBN | 0.30 |

Procedure and Preparation:

Charge 1 to the reactor and heat to 80±2° C. Mix 2, 3 and 4 in a separate monomer vessel and then add 6 and wash into the vessel with 5, mix well. Add this monomer phase to the reactor over a 3 hour delayed addition period, maintaining a reaction temperature of 80±2° C. Upon completion of the delayed monomer feed, hold for 30 minutes at 80±2° C., then add the mixture of 7 and 8 to the reactor over 30 minutes. Once complete, hold the reactor at 80±2° C. for 3 hours. Cool the contents of the reactor to room temperature and decant.

Specification:
Solids content/%: 50.60
Mol.Wt/Da.: $M_n/M_w$/PD: 23000/59000/2.5
Tg (OC): 40

Preparation of Co-polymer B
Polymer: MMA/iPGMA: 40.0/60.0
Xylene: 98.8% on total monomer
AiBN: 1.52% on total monomer
Composition:

| No. | Component | Amount/g |
|---|---|---|
| 1 | Xylene | 103.20 |
| 2 | MMA | 60.00 |
| 3 | iPGMA | 90.00 |
| 4 | Xylene | 45.00 |
| 5 | AiBN | 2.28 |

Procedure and Preparation:

Charge 1 to the reactor and heat to 85±2° C. Mix 2 and 3 in a separate monomer vessel and then add 5 and wash into the vessel 4, mix well. Add this monomer phase to the reactor over a 3 hour delayed addition period, maintaining a reaction temperature of 85±2° C. Upon completion of the delayed monomer feed, hold the reactor at 85±2° C. for 3 hours. Cool the contents of the reactor to room temperature and decant.

Specification:
Solids content/%: 50.68
Mol.Wt/Da.: $M_n/M_w$/PD: 17000/31000/1.9
Tg (OC): 46

Preparation of Co-polymer C
Polymer: MMA/iPGEOMA/MOXEA: 37.0/56.0/7.0
Xylene: 98.8% on total monomer
AiBN: 1.52% on total monomer
Composition:

| No. | Component | Amount/g |
|---|---|---|
| 1 | Xylene | 103.20 |
| 2 | MMA | 55.50 |
| 3 | iPGEOMA | 84.00 |
| 4 | MOXEA | 10.50 |
| 5 | Xylene | 45.00 |
| 6 | AiBN | 2.28 |

Procedure and Preparation:

Charge 1 to the reactor and heat to 85±2° C.

Mix 2, 3 and 4 in a separate monomer vessel and then add 6 and wash into the vessel 5, mix well. Add this monomer phase to the reactor over a 3 hour delayed addition period, maintaining a reaction temperature of 85±2° C.

Upon completion of the delayed monomer feed, hold the reactor at 85±2° C. for 3 hours.

Cool the contents of the reactor to room temperature and decant.

Specification:
Solids content/%: 50.68
Mol.Wt/Da.: $M_n/M_w$/PD: 18000/36000
Tg (OC): −37

Preparation of Co-polymer D
Polymer: MMA/iPGMA/MOXEA: 37.0/56.0/7.0
Xylene: 98.8% on total monomer
AiBN: 1.52% on total monomer
Composition:

| No. | Component | Amount/g |
|---|---|---|
| 1 | Xylene | 103.20 |
| 2 | MMA | 55.50 |
| 3 | iPGMA | 84.00 |
| 4 | MOXEA | 10.50 |
| 5 | Xylene | 45.00 |
| 6 | AiBN | 2.28 |

Procedure and Preparation:

Charge 1 to the reactor and heat to 80±2° C. Mix 2, 3 and 4 in a separate monomer vessel and then add 6 and wash into the vessel with 5, mix well. Add this monomer phase to the reactor over a 3 hour delayed addition period, maintaining a reaction temperature of 80±2° C. Upon completion of the delayed monomer feed, hold the reactor at 80±2° C. for 3 hours. Cool the contents of the reactor to room temperature and decant.

Specification:
Solids content/%: 50.60
Mol.Wt/Da.: $M_n/M_w$/PD:17000/35000/2.0
Tg (OC): 34

Preparation of Co-polymer E
Polymer: MMA/GCA: 70.0/30.0
AiBN: 3% on total monomer Composition:

| No. | Component | Amount/g |
|---|---|---|
| 1 | MEK | 550 |
| 2 | MMA | 105.50 |
| 3 | GCA | 45.50 |
| 4 | AiBN | 4.5 |
| 5 | MEK | 50 |

Procedure and Preparation:

Charge 1 to the reactor and heat to 70±2° C. Mix 2 and 3 in a separate monomer vessel and then add 4 and wash into the vessel with 5, mix well. Add this monomer phase to the reactor over a 3 hour delayed addition period, maintaining a reaction temperature of 70±2° C. Upon completion of the delayed monomer feed, hold the reactor at 70±2° C. for 16 hours. Cool the contents of the reactor to room temperature and decant.

Specification:
Solids content/%: 50
Preparation of Co-polymer E2
Polymer: MMA/GCA: 70.0/30.0
AiBN: 1.52% on total monomer Composition:

| No. | Component | Amount/g |
|---|---|---|
| 1 | MEK | 103.20 |
| 2 | MMA | 105.50 |
| 3 | GCA | 45.50 |
| 4 | AiBN | 2.28 |
| 5 | MEK | 45 |

Procedure and Preparation:

Charge 1 to the reactor and heat to 70±2° C. Mix 2 and 3 in a separate monomer vessel and then add 4 and wash into the vessel with 5, mix well. Add this monomer phase to the reactor over a 3 hour delayed addition period, maintaining a reaction temperature of 70±2° C. Upon completion of the delayed monomer feed, hold the reactor at 70±2° C. for 16 hours. Cool the contents of the reactor to room temperature and decant.

Specification:
Solids content/%: 25
Mol.Wt/Da.: $M_n/M_w$/PD: 52300/102000/1.9
Tg (OC): 49
Preparation of IPGMA Co-Polymers
Composition and Specification:

TABLE 3

Co-polymers comprising IPGMA

| Co-polymer code | Composition | | Amount (g) | | | | | | | | |
| | Monomers | Ratio | MMA | IPGMA | MOXEA | TIPSA | AIBN | Xylene | Mn | Mw | PDI | Tg (° C.) |
|---|---|---|---|---|---|---|---|---|---|---|---|---|
| F | IPGMA | 100 | — | 150 | — | — | 2.28 | 148.20 | 32800 | 49700 | 1.5 | 37 |
| B1 | IPGMA/TIPSA | 60/40 | — | 90 | — | 60 | 2.28 | 148.20 | 17500 | 24200 | 1.4 | 19 |
| B2 | IPGMA/MMA | 80/20 | 30 | 120 | — | — | 2.28 | 148.20 | 32500 | 49500 | 1.5 | 46 |
| B3 | IPGMA/MMA | 20/80 | 120 | 30 | — | — | 2.28 | 148.20 | 32700 | 50600 | 1.5 | 53 |
| A1 | MMA/MOXEA/IPGMA | 25/5/70 | 37.5 | 105 | 7.5 | — | 2.28 | 148.20 | 56700 | 98500 | 1.7 | 20 |
| A2 | MMA/MOXEA/IPGMA | 15/15/70 | 22.5 | 105 | 22.5 | — | 2.28 | 148.20 | 32500 | 53500 | 1.6 | 20 |
| A3 | MMA/MOXEA/IPGMA | 40/10/50 | 60 | 75 | 15 | — | 2.28 | 148.20 | 34700 | 52300 | 1.5 | 20 |
| A4 | MMA/TIPSA/IPGMA | 37/7/56 | 55.5 | 84 | — | 10.5 | 2.28 | 148.20 | 32400 | 49100 | 1.5 | 31 |
| A5 | MMA/TIPSA/IPGMA | 10/20/70 | 15 | 105 | — | 30 | 2.28 | 148.20 | 42500 | 76900 | 1.8 | 32 |
| A6 | MMA/TIPSA/IPGMA | 30/20/50 | 45 | 75 | — | 30 | 2.28 | 148.20 | 30400 | 49400 | 1.6 | 19 |
| A7 | MMA/TIPSA/IPGMA | 20/20/60 | 30 | 90 | — | 30 | 2.28 | 148.20 | 25000 | 37400 | 1.5 | 5 |

Procedure and Preparation:

Charge 70% of xylene to the reactor and heat to 85±2° C. Mix monomers in a separate monomer vessel and then add AIBN and wash into the vessel with the rest of xylene, mix well. Add this monomer phase to the reactor over a 3 hour delayed addition period, maintaining a reaction temperature of 85±2° C. Upon completion of the delayed monomer feed, hold the reactor at 85±2° C. for 3 hours. Cool the contents of the reactor to room temperature and decant.

Xylene: 98.8% on total monomer
AiBN: 1.52% on total monomer
Preparation of IPGEOMA Co-Polymers
Composition and Specification:

TABLE 4

Co-polymers comprising IPGEOMA

| Co-polymer code | Composition | | Amount (g) | | | | | | | | |
| | Monomers | Ratio | MMA | IPGEOMA | MOXEA | TIPSA | AIBN | Xylene | Mn | Mw | PDI | Tg (° C.) |
|---|---|---|---|---|---|---|---|---|---|---|---|---|
| G | IPGEOMA | 100 | — | 150 | — | — | 2.28 | 148.20 | 40100 | 65500 | 1.6 | −55 |
| D1 | IPGEOMA/MMA | 60/40 | 60 | 90 | — | — | 2.28 | 148.20 | 35700 | 56100 | 1.6 | −37 |
| D2 | IPGEOMA/TIPSA | 60/40 | — | 90 | — | 60 | 2.28 | 148.20 | 22200 | 27500 | 1.2 | −53 |

TABLE 4-continued

Co-polymers comprising IPGEOMA

| Co-poly-mer code | Composition Monomers | Ratio | Amount (g) MMA | IPGEOMA | MOXEA | TIPSA | AIBN | Xylene | Mn | Mw | PDI | Tg (° C.) |
|---|---|---|---|---|---|---|---|---|---|---|---|---|
| D3 | IPGEOMA/MMA | 80/20 | 30 | 120 | — | — | 2.28 | 148.20 | 38100 | 60500 | 1.6 | −54 |
| D4 | IPGEOMA/MMA | 20/80 | 120 | 30 | — | — | 2.28 | 148.20 | 34500 | 47200 | 1.4 | 46 |
| C1 | MMA/MOXE/IPGEOMA | 25/7/70 | 37.5 | 105 | 7.5 | — | 2.28 | 148.20 | 35700 | 57000 | 1.6 | −42 |
| C2 | MMA/MOXE/IPGEOMA | 15/15/70 | 22.5 | 105 | 22.5 | — | 2.28 | 148.20 | 38600 | 62000 | 1.6 | −55 |
| C3 | MMA/MOXE/IPGEOMA | 40/10/50 | 60 | 75 | 15 | — | 2.28 | 148.20 | 35200 | 55100 | 1.6 | −36 |
| C4 | MMA/TIPSA/IPGEOMA | 37/7/56 | 55.5 | 84 | — | 10.5 | 2.28 | 148.20 | 36000 | 50500 | 1.4 | −39 |
| C5 | MMA/TIPSA/IPGEOMA | 10/20/70 | 15 | 105 | — | 30 | 2.28 | 148.20 | 31600 | 49400 | 1.6 | −52 |
| C6 | MMA/TIPSA/IPGEOMA | 30/20/50 | 45 | 75 | — | 30 | 2.28 | 148.20 | 30200 | 44100 | 1.5 | −41 |
| C7 | MMA/TIPSA/IPGEOMA | 20/20/60 | 30 | 90 | — | 30 | 2.28 | 148.20 | 33500 | 53600 | 1.6 | −47 |

Procedure and Preparation:

Charge 70% of xylene to the reactor and heat to 85±2° C. Mix monomers in a separate monomer vessel and then add AIBN and wash into the vessel with the rest of xylene, mix well. Add this monomer phase to the reactor over a 3 hour delayed addition period, maintaining a reaction temperature of 85±2° C. Upon completion of the delayed monomer feed, hold the reactor at 85±2° C. for 3 hours. Cool the contents of the reactor to room temperature and decant.

Xylene: 98.8% on total monomer
AiBN: 1.52% on total monomer

Preparation of GCA/GCMA Co-Polymers
Composition and Specification:

TABLE 5

Co-polymers comprising GCA/GCMA

| Co-poly-mer code | Composition Monomers | Ratio | Amount (g) MMA | GC(M)A | MOXEA | TIPSA | AIBN | MEK | Mn | Mw | PDI | Tg (° C.) |
|---|---|---|---|---|---|---|---|---|---|---|---|---|
| E1 | GCA/MMA | 20/80 | 120 | 30 | — | — | 2.28 | 148.20 | 30700 | 45500 | 1.5 | 42 |
| E2 | GCA/MMA | 30/70 | 105 | 45 | — | — | 2.28 | 148.20 | 52300 | 102000 | 1.9 | 49 |
| F1* | MMA/MOXEA/GCA | 40/10/50 | 60 | 75 | 15 | — | 2.28 | 148.20 | 37900 | 67800 | 1.8 | 38 |
| E4 | GCMA/MMA | 20/80 | 120 | 30 | — | — | 2.28 | 148.20 | 39800 | 56300 | 1.4 | 55/80 |
| E5 | GCMA/MMA | 30/70 | 105 | 45 | — | — | 2.28 | 148.20 | 44700 | 60500 | 1.4 | 86 |
| E3* | GCMA/MMA | 60/40 | 60 | 90 | — | — | 2.28 | 148.20 | 29400 | 40600 | 1.4 | 58/97 |
| F2 | MMA/MOXEA/GCMA | 37/7/56 | 55.5 | 84 | 10.5 | — | 2.28 | 148.20 | 45200 | 67900 | 1.5 | 63/82 |
| F3 | MMA/MOXEA/GCMA | 40/10/50 | 60 | 75 | 15 | — | 2.28 | 148.20 | 49200 | 70500 | 1.4 | 73 |
| F4 | MMA/TIPSA/GCMA | 37/7/56 | 55.5 | 84 | — | 10.5 | 2.28 | 148.20 | 47400 | 68600 | 1.4 | 86 |
| F5 | MMA/TIPSA/GCMA | 30/20/50 | 45 | 75 | — | 30 | 2.28 | 148.20 | 40100 | 62700 | 1.6 | 77 |

Procedure and Preparation:

Charge 70% of MEK to the reactor and heat to 80±2° C. Mix monomers in a separate monomer vessel and then add AIBN and wash into the vessel with the rest of MEK, mix well. Add this monomer phase to the reactor over a 3 hour delayed addition period, maintaining a reaction temperature of 80±2° C. Upon completion of the delayed monomer feed, hold the reactor at 80±2° C. for 3 hours. Cool the contents of the reactor to room temperature and decant.

MEK: 98% on total monomer
AiBN: 1.52% on total monomer
*1% mercaptane was used as radicals scavenger Coating Compositions and Results

TABLE 6

Model paints where co-polymers of the invention fully replace a silyl acrylate binder. The model paints in table 6 illustrate that the co-polymers of the invention are able to replace silyl acrylate to obtain a paint with similar performance on raft. Further, all paints polish in the lab rotor.

| Model paints | Top coat composition Example 1 (reference) Wt-% | VS-% | Top coat composition Example 2 Wt-% | VS-% | Top coat composition Example 3 Wt-% | VS-% | Top coat composition Example 4 Wt-% | VS-% | Top coat composition Example 5 Wt-% | VS-% |
|---|---|---|---|---|---|---|---|---|---|---|
| Binder system: | | | | | | | | | | |
| Gum rosin | 6 | 16 | 6 | 16 | 6 | 16 | 6 | 16 | 6 | 16 |
| Silyl acrylate binder | 24 | 38 | | | | | | | | |

TABLE 6-continued

Model paints where co-polymers of the invention fully replace a silyl acrylate binder.
The model paints in table 6 illustrate that the co-polymers of the invention are able to replace
silyl acrylate to obtain a paint with similar performance on raft. Further, all paints polish in
the lab rotor.

| Model paints | Top coat composition Example 1 (reference) | | Top coat composition Example 2 | | Top coat composition Example 3 | | Top coat composition Example 4 | | Top coat composition Example 5 | |
|---|---|---|---|---|---|---|---|---|---|---|
| | Wt-% | VS-% | Wt-% | VS-% | Wt-% | VS-% | Wt-% | VS-% | Wt-% | VS-% |
| Co-polymer A | | | 24 | 38 | | | | | | |
| Co-polymer B | | | | | 24 | 38 | | | | |
| Co-polymer C | | | | | | | 24 | 38 | | |
| Co-polymer D | | | | | | | | | 24 | 38 |
| Biocides: | | | | | | | | | | |
| Copper pyrithione | 3 | 6 | 3 | 6 | 3 | 6 | 3 | 6 | 3 | 6 |
| Cuprous oxide | 49 | 27 | 49 | 27 | 49 | 27 | 49 | 27 | 49 | 27 |
| Other ingredients: | | | | | | | | | | |
| Additives (thickeners, wetting agent, antigelling agent and thixotropic agent) | 5 | 5 | 5 | 5 | 5 | 5 | 5 | 5 | 5 | 5 |
| Silicate filler | 2 | 3 | 2 | 3 | 2 | 3 | 2 | 3 | 2 | 3 |
| Fibers | 1 | 1 | 1 | 1 | 1 | 1 | 1 | 1 | 1 | 1 |
| Iron Oxide | 5 | 4 | 5 | 4 | 5 | 4 | 5 | 4 | 5 | 4 |
| Solvents: | | | | | | | | | | |
| Xylene | 5 | — | 14 | — | 14 | — | 14 | — | 14 | — |
| Total | 100 | 100 | 100 | 100 | 100 | 100 | 100 | 100 | 100 | 100 |
| Performance on raft in Spain after 35 weeks | Excellent | | Excellent | | Excellent | | Excellent | | Excellent | |
| Performance on raft in Singapore after 16 weeks | Good | | Good | | Good | | Good | | Good | |
| Polishing rate (μm/10.000 Nautical miles) | 5 | | 1 | | 1 | | 15 | | 1 | |

TABLE 7

Model paints where IPGMA co-polymers of the invention fully replace a silyl acrylate
binder. The results show that the IPGMA co-polymers of the invention are able to replace silyl
acrylate to obtain a paint with similar performance on raft. Further, the paints polish in the
lab rotor (Examples 8 and 9 were not tested for polishing).

| Model paints | Top coat composition Example 1 (reference) | | Top coat composition Example 6 | | Top coat composition Example 7 | | Top coat composition Example 8 | | Top coat composition Example 9 | |
|---|---|---|---|---|---|---|---|---|---|---|
| | Wt-% | VS-% | Wt-% | VS-% | Wt-% | VS-% | Wt-% | VS-% | Wt-% | VS-% |
| Binder system: | | | | | | | | | | |
| Gum rosin | 6 | 16 | 6 | 16 | 6 | 16 | 6 | 16 | 6 | 16 |
| Silyl acrylate binder | 24 | 38 | | | | | | | | |
| Co-polymer F | | | 24 | 38 | | | | | | |
| Co-polymer B1 | | | | | 24 | 38 | | | | |
| Co-polymer B2 | | | | | | | 24 | 38 | | |
| Co-polymer B3 | | | | | | | | | 24 | 38 |
| Biocides: | | | | | | | | | | |
| Copper pyrithione | 3 | 6 | 3 | 6 | 3 | 6 | 3 | 6 | 3 | 6 |
| Cuprous oxide | 49 | 27 | 49 | 27 | 49 | 27 | 49 | 27 | 49 | 27 |
| Other ingredients: | | | | | | | | | | |
| Additives (thickeners, wetting agent, anti-gelling agent and thixotropic agent) | 5 | 5 | 5 | 5 | 5 | 5 | 5 | 5 | 5 | 5 |
| Silicate filler | 2 | 3 | 2 | 3 | 2 | 3 | 2 | 3 | 2 | 3 |
| Fibers | 1 | 1 | 1 | 1 | 1 | 1 | 1 | 1 | 1 | 1 |
| Iron Oxide | 5 | 4 | 5 | 4 | 5 | 4 | 5 | 4 | 5 | 4 |

TABLE 7-continued

Model paints where IPGMA co-polymers of the invention fully replace a silyl acrylate binder. The results show that the IPGMA co-polymers of the invention are able to replace silyl acrylate to obtain a paint with similar performance on raft. Further, the paints polish in the lab rotor (Examples 8 and 9 were not tested for polishing).

| Model paints | Top coat composition Example 1 (reference) | | Top coat composition Example 6 | | Top coat composition Example 7 | | Top coat composition Example 8 | | Top coat composition Example 9 | |
|---|---|---|---|---|---|---|---|---|---|---|
| | Wt-% | VS-% | Wt-% | VS-% | Wt-% | VS-% | Wt-% | VS-% | Wt-% | VS-% |
| Solvents: | | | | | | | | | | |
| Xylene | 5 | — | 14 | — | 14 | — | 14 | — | 14 | — |
| Total | 100 | 100 | 100 | 100 | 100 | 100 | 100 | 100 | 100 | 100 |
| Performance on raft in Singapore after 16 weeks | Good | | Poor | | Very Good | | Good | | Very Good | |
| Polishing rate (μm/10.000 Nautical miles) | 5 | | 1 | | 4 | | — | | — | |

TABLE 8

Model paints where IPGMA co-polymers of the invention fully replace a silyl acrylate binder. The results show that the IPGMA co-polymers (ter-polymers with MOXEA or TIPSA in addition to MMA) of the invention are able to replace silyl acrylate to obtain a paint with similar or even better performance on raft. Further, the paints polish in the lab rotor (Examples 10-12 were not tested for polishing).

| Model paints | Top coat composition Example 1 (reference) | | Top coat composition Example 10 | | Top coat composition Example 11 | | Top coat composition Example 12 | | Top coat composition Example 13 | |
|---|---|---|---|---|---|---|---|---|---|---|
| | Wt-% | VS-% | Wt-% | VS-% | Wt-% | VS-% | Wt-% | VS-% | Wt-% | VS-% |
| Binder system: | | | | | | | | | | |
| Gum rosin | 6 | 16 | 6 | 16 | 6 | 16 | 6 | 16 | 6 | 16 |
| Silyl acrylate binder | 24 | 38 | | | | | | | | |
| Co-polymer A1 | | | 24 | 38 | | | | | | |
| Co-polymer A2 | | | | | 24 | 38 | | | | |
| Co-polymer A3 | | | | | | | 24 | 38 | | |
| Co-polymer A4 | | | | | | | | | 24 | 38 |
| Biocides: | | | | | | | | | | |
| Copper pyrithione | 3 | 6 | 3 | 6 | 3 | 6 | 3 | 6 | 3 | 6 |
| Cuprous oxide | 49 | 27 | 49 | 27 | 49 | 27 | 49 | 27 | 49 | 27 |
| Other ingredients: | | | | | | | | | | |
| Additives (thickeners, wetting agent, anti-gelling agent and thixotropic agent) | 5 | 5 | 5 | 5 | 5 | 5 | 5 | 5 | 5 | 5 |
| Silicate filler | 2 | 3 | 2 | 3 | 2 | 3 | 2 | 3 | 2 | 3 |
| Fibers | 1 | 1 | 1 | 1 | 1 | 1 | 1 | 1 | 1 | 1 |
| Iron Oxide | 5 | 4 | 5 | 4 | 5 | 4 | 5 | 4 | 5 | 4 |
| Solvents: | | | | | | | | | | |
| Xylene | 5 | — | 14 | — | 14 | — | 14 | — | 14 | — |
| Total | 100 | 100 | 100 | 100 | 100 | 100 | 100 | 100 | 100 | 100 |
| Performance on raft in Singapore after 16 weeks | Good | | Very Good | | Good | | Very Good | | Very Good | |
| Polishing rate (μm/10.000 Nautical miles) | 5 | | — | | — | | — | | 1 | |

TABLE 9

Model paints where IPGMA co-polymers of the invention fully replace a silyl acrylate binder. The results show that the IPGMA co-polymers (ter-polymers with TIPSA in addition to MMA) of the invention are able to replace silyl acrylate to obtain a paint with similar or even better performance on raft. Further, the paints polish in the lab rotor (Examples 14-16 were not tested for polishing).

| Model paints | Top coat composition Example 1 (reference) | | Top coat composition Example 14 | | Top coat composition Example 15 | | Top coat composition Example 16 | |
|---|---|---|---|---|---|---|---|---|
| | Wt-% | VS-% | Wt-% | VS-% | Wt-% | VS-% | Wt-% | VS-% |
| Binder system: | | | | | | | | |
| Gum rosin | 6 | 16 | 6 | 16 | 6 | 16 | 6 | 16 |
| Silyl acrylate binder | 24 | 38 | | | | | | |
| Co-polymer A5 | | | 24 | 38 | | | | |
| Co-polymer A6 | | | | | 24 | 38 | | |
| Co-polymer A7 | | | | | | | 24 | 38 |
| Biocides: | | | | | | | | |
| Copper pyrithione | 3 | 6 | 3 | 6 | 3 | 6 | 3 | 6 |
| Cuprous oxide | 49 | 27 | 49 | 27 | 49 | 27 | 49 | 27 |
| Other ingredients: | | | | | | | | |
| Additives (thickeners, wetting agent, anti-gelling agent and thixotropic agent) | 5 | 5 | 5 | 5 | 5 | 5 | 5 | 5 |
| Silicate filler | 2 | 3 | 2 | 3 | 2 | 3 | 2 | 3 |
| Fibers | 1 | 1 | 1 | 1 | 1 | 1 | 1 | 1 |
| Iron Oxide | 5 | 4 | 5 | 4 | 5 | 4 | 5 | 4 |
| Solvents: | | | | | | | | |
| Xylene | 5 | — | 14 | — | 14 | — | 14 | — |
| Total | 100 | 100 | 100 | 100 | 100 | 100 | 100 | 100 |
| Performance on raft in Singapore after 16 weeks | Good | | Very Good | | Very Good | | Good | |
| Polishing rate (μm/10.000 Nautical miles) | 5 | | — | | — | | — | |

TABLE 10

Model paints where IPGEOMA co-polymers of the invention fully replace a silyl acrylate binder. The results show that the IPGEOMA co-polymers (homo-polymers or bis-polymer with MMA or TIPSA) of the invention are able to replace silyl acrylate to obtain a paint with similar performance on raft. Further, the paints polish in the lab rotor (Examples 17 and 19 were not tested for polishing).

| Model paints | Top coat composition Example 1 (reference) | | Top coat composition Example 17 | | Top coat composition Example 18 | | Top coat composition Example 19 | | Top coat composition Example 20 | |
|---|---|---|---|---|---|---|---|---|---|---|
| | Wt-% | VS-% | Wt-% | VS-% | Wt-% | VS-% | Wt-% | VS-% | Wt-% | VS-% |
| Binder system: | | | | | | | | | | |
| Gum rosin | 6 | 16 | 6 | 16 | 6 | 16 | 6 | 16 | 6 | 16 |
| Silyl acrylate binder | 24 | 38 | | | | | | | | |
| Co-polymer G | | | 24 | 38 | | | | | | |
| Co-polymer D1 | | | | | 24 | 38 | | | | |
| Co-polymer D2 | | | | | | | 24 | 38 | | |
| Co-polymer D4 | | | | | | | | | 24 | 38 |
| Biocides: | | | | | | | | | | |
| Copper pyrithione | 3 | 6 | 3 | 6 | 3 | 6 | 3 | 6 | 3 | 6 |
| Cuprous oxide | 49 | 27 | 49 | 27 | 49 | 27 | 49 | 27 | 49 | 27 |
| Other ingredients: | | | | | | | | | | |
| additives (thickeners, wetting agent, anti-gelling agent and | 5 | 5 | 5 | 5 | 5 | 5 | 5 | 5 | 5 | 5 |

TABLE 10-continued

Model paints where IPGEOMA co-polymers of the invention fully replace a silyl acrylate binder. The results show that the IPGEOMA co-polymers (homo-polymers or bis-polymer with MMA or TIPSA) of the invention are able to replace silyl acrylate to obtain a paint with similar performance on raft. Further, the paints polish in the lab rotor (Examples 17 and 19 were not tested for polishing).

| Model paints | Top coat composition Example 1 (reference) Wt-% | VS-% | Top coat composition Example 17 Wt-% | VS-% | Top coat composition Example 18 Wt-% | VS-% | Top coat composition Example 19 Wt-% | VS-% | Top coat composition Example 20 Wt-% | VS-% |
|---|---|---|---|---|---|---|---|---|---|---|
| thixotropic agent) | | | | | | | | | | |
| Silicate filler | 2 | 3 | 2 | 3 | 2 | 3 | 2 | 3 | 2 | 3 |
| Fibers | 1 | 1 | 1 | 1 | 1 | 1 | 1 | 1 | 1 | 1 |
| Iron Oxide | 5 | 4 | 5 | 4 | 5 | 4 | 5 | 4 | 5 | 4 |
| Solvents: | | | | | | | | | | |
| Xylene | 5 | — | 14 | — | 14 | — | 14 | — | 14 | — |
| Total | 100 | 100 | 100 | 100 | 100 | 100 | 100 | 100 | 100 | 100 |
| Performance on raft in Singapore after 8 weeks | Excellent | | Excellent | | Excellent | | Excellent | | Excellent | |
| Polishing rate (µm/10.000 Nautical miles) | 5 | | — | | 4 | | — | | 3 | |

TABLE 11

Model paints where IPGEOMA co-polymers and GCA co-polymers of the invention fully replace a silyl acrylate binder. The results show that the IPGEOMA co-polymers (ter-polymers with MMA and TIPSA) and the GCA co-polymers (bis-polymers with MMA and ter-polymers with MMA and MOXEA) of the invention are able to replace silyl acrylate to obtain a paint with similar performance on raft. Further, the paints polish in the lab rotor (Examples 21-23 were not tested for polishing).

| Model paints | Top coat composition Example 1 (reference) Wt-% | VS-% | Top coat composition Example 21 Wt-% | VS-% | Top coat composition Example 22 Wt-% | VS-% | Top coat composition Example 23 Wt-% | VS-% | Top coat composition Example 24 Wt-% | VS-% |
|---|---|---|---|---|---|---|---|---|---|---|
| Binder system: | | | | | | | | | | |
| Gum rosin | 6 | 16 | 6 | 16 | 6 | 16 | 6 | 16 | 6 | 16 |
| Silyl acrylate binder | 24 | 38 | | | | | | | | |
| Co-polymer C4 | | | 24 | 38 | | | | | | |
| Co-polymer C6 | | | | | 24 | 38 | | | | |
| Co-polymer E1 | | | | | | | 24 | 38 | | |
| Co-polymer F1 | | | | | | | | | 24 | 38 |
| Biocides: | | | | | | | | | | |
| Copper pyrithione | 3 | 6 | 3 | 6 | 3 | 6 | 3 | 6 | 3 | 6 |
| Cuprous oxide | 49 | 27 | 49 | 27 | 49 | 27 | 49 | 27 | 49 | 27 |
| Other ingredients: | | | | | | | | | | |
| Additives (thickeners, wetting agent, anti-gelling agent and thixotropic agent) | 5 | 5 | 5 | 5 | 5 | 5 | 5 | 5 | 5 | 5 |
| Silicate filler | 2 | 3 | 2 | 3 | 2 | 3 | 2 | 3 | 2 | 3 |
| Fibers | 1 | 1 | 1 | 1 | 1 | 1 | 1 | 1 | 1 | 1 |
| Iron Oxide | 5 | 4 | 5 | 4 | 5 | 4 | 5 | 4 | 5 | 4 |
| Solvents: | | | | | | | | | | |
| Xylene | 5 | — | 14 | — | 14 | — | 14 | — | 14 | — |
| Total | 100 | 100 | 100 | 100 | 100 | 100 | 100 | 100 | 100 | 100 |
| Performance on raft in Singapore after 8 weeks | Excellent | | Excellent | | Excellent | | Excellent | | Good | |
| Polishing rate (µm/10.000 Nautical miles) | 5 | | 33 | | — | | — | | 1 | |

TABLE 12

The model paints in tables 12 and 13 (Examples 25-33) illustrate that the polymers of the invention can be combined with different binder systems (nano acrylate, metal acrylate, silyl acrylate and rosin) to obtain a paint with similar performance on raft, except for example 27, which does not contain any rosin. Further, all paints polish in the lab rotor and different polishing rates can be achieved by different binder combinations. For Examples 26 and 27, longer times are needed for polishing measurements.

| Model paints | Top coat composition Example 25 (rosin reference) Wt-% | VS-% | Top coat composition Example 26 Wt-% | VS-% | Top coat composition Example 27 Wt-% | VS-% | Top coat composition Example 28 Silyl reference Wt-% | VS-% | Top coat composition Example 29 Wt-% | VS-% |
|---|---|---|---|---|---|---|---|---|---|---|
| Binder system: | | | | | | | | | | |
| Gum rosin | 14 | 40 | 7 | 20 | | | 4 | 12.5 | 4 | 13 |
| Silyl acrlate binder | | | | | | | 24 | 38.5 | 12 | 19 |
| Acrylic co-binder | 5 | 6 | 4.5 | 6 | 4 | 6 | | | | |
| Acrylate co-binder | 3 | 5 | 2.5 | 5 | 2.5 | 5 | | | | |
| Co-polymer D | | | 13 | 20 | 27 | 40 | | | 12 | 19 |
| Biocides: | | | | | | | | | | |
| Zineb | 9 | 14 | 9 | 14 | 8.5 | 14 | | | | |
| Cuprous oxide | 28 | 14 | 27 | 14 | 26.5 | 14 | 48 | 27.5 | 48 | 27.5 |
| Copper pyrithione | | | | | | | 3 | 6 | 6 | 6 |
| Other ingredients: | | | | | | | | | | |
| Additives (thickeners, wetting agent, anti-gelling agent and thixotropic agent) | 2.5 | 4 | 2.5 | 4 | 2.5 | 4 | 5 | 4.5 | 4 | 4.5 |
| Silicate filler | 2.5 | 3 | 2.5 | 3 | 2.5 | 3 | 5 | 6 | 5 | 6 |
| Fibers | 5 | 5 | 4.5 | 5 | 5 | 5 | 1 | 1 | 1 | 1 |
| Iron Oxide | 5 | 3 | 5 | 3 | 4.5 | 3 | 5 | 4 | 5 | 4 |
| Zinc Oxide | 11 | 6 | 10.5 | 6 | 10 | 6 | | | | |
| Solvents: | | | | | | | | | | |
| Xylene | 14 | — | 11 | — | 6 | — | 5 | — | 6 | — |
| MIBK | 1 | | 1 | | 1 | | | | | |
| Total | 100 | 100 | 100 | 100 | 100 | 100 | 100 | 100 | 100 | 100 |
| Performance on raft in Singapore after 16 weeks | Good | | Good | | Poor | | Very Good | | Very Good | |
| Polishing rate (μm/10.000 Nautical miles) | 0 | | * | | * | | 5 | | 6 | |

TABLE 13

| Model paints | Top coat composition Example 30 Nanoacrylate reference Wt-% | VS-% | Top coat composition Example 31 Wt-% | VS-% | Top coat composition Example 32 Metal acrylate Wt-% | VS-% | Top coat composition Example 33 Wt-% | VS-% |
|---|---|---|---|---|---|---|---|---|
| Binder system: | | | | | | | | |
| Gum rosin | 8.5 | 28 | 8.5 | 28 | 8.5 | 28 | 8.5 | 28 |
| Nanoacrylate binder | 11 | 19 | 5.5 | 9.5 | | | | |
| Metal Acrylate binder | | | | | 11 | 19 | 5.5 | 9.5 |
| Plasticizer | 2 | 3 | 2 | 3 | 2 | 3 | 2 | 3 |
| Co-polymer D | | | 5.5 | 9.5 | | | 5.5 | 9.5 |
| Biocides: | | | | | | | | |
| Cuprous oxide | 42 | 24 | 42 | 24 | 42 | 24 | 42 | 24 |
| Copper pyrithione | 3 | 5.5 | 3 | 5.5 | 3 | 5.5 | 3 | 5.5 |
| Other ingredients: | | | | | | | | |
| Additives (thickeners, wetting agent, anti-gelling agent and thixtropic agent) | 2.5 | 4.5 | 2.5 | 4.5 | 2.5 | 4.5 | 2.5 | 4.5 |
| Silicate filler | 4 | 5 | 4 | 5 | 4 | 5 | 4 | 5 |
| Fibers | 1 | 1 | 1 | 1 | 1 | 1 | 1 | 1 |
| Iron Oxide | 5 | 4 | 5 | 4 | 5 | 4 | 5 | 4 |
| Zinc Oxide | 9 | 6 | 9 | 6 | 9 | 6 | 9 | 6 |

TABLE 13-continued

| Model paints | Top coat composition Example 30 Nanoacrylate reference | | Top coat composition Example 31 | | Top coat composition Example 32 Metal acrylate | | Top coat composition Example 33 | |
|---|---|---|---|---|---|---|---|---|
| | Wt-% | VS-% | Wt-% | VS-% | Wt-% | VS-% | Wt-% | VS-% |
| Solvents: | | | | | | | | |
| Xylene | 9 | — | 9 | — | 9 | — | 9 | — |
| MIBK | 3 | | 3 | | 3 | | 3 | |
| Total | 100 | 100 | 100 | 100 | 100 | 100 | 100 | 100 |
| Performance on raft in Singapore after 16 weeks | Excellent | | Excellent | | Excellent | | Good | |
| Polishing rate (μm/10.000 Nautical miles) | 8 | | 10 | | — | | 5 | |

The invention claimed is:

1. An antifouling coating composition comprising an erodible binder system,
wherein said binder system comprises a polymer of ethylenically unsaturated monomers, said monomers including at least one monomer of the general formula (I):

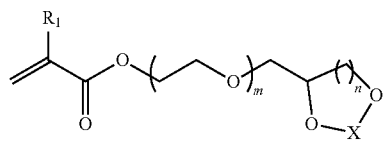

wherein in is 0-50, n is 1-3, $R_1$ is selected from hydrogen and methyl, and X is selected from >C=O or >C($R_2$)($R_3$), wherein $R_2$ and $R_3$ are independently selected from hydrogen, $C_{1-20}$-alkyl and aryl, and
wherein said erodible binder system comprises one or more further binder components.

2. The antifouling coating composition according to claim 1, wherein said one or more further binder components comprise a rosin.

3. The antifouling coating composition according to claim 1, wherein the coating composition comprises 15-75% by dry weight of the binder system.

4. The antifouling coating composition according to claim 1 wherein m is 1-12.

5. The antifouling coating composition according to claim 1, wherein n is 1-3.

6. The antifouling coating composition according to claim 1, wherein X is >C=O.

7. The antifouling coating composition according to claim 1, wherein X is >C($R_2$)($R_3$), wherein $R_2$ and $R_3$ both are methyl.

8. The antifouling coating composition according to claim 1, wherein the monomer of formula (I) is at least one of (2,2-dimethyl-1,3-dioxolan-4-yl)methyl (meth)acrylate (IPGA/IPGMA) and isopropylidene glycerol ethoxylated (meth)acrylate (iPGEOA/iPGEOMA).

9. The antifouling coating composition according to claim 1, wherein the monomers of formula (I) in total constitutes 5-100% by weight of the polymer.

10. The antifouling coating composition according to claim 1, wherein the monomer of formula (I) is at least one of (2,2-dimethyl-1,3-dioxolan-4-yl)methyl methacrylate (IPGMA), isopropylidene glycerol ethoxylated methacrylate (iPGEOMA) and (2-oxo-1,3-dioxolan-4-yl)methyl acrylate (GCA).

11. The antifouling coating composition according to claim 1, wherein the ethylenically unsaturated monomer(s) other than those of general formula (I) are selected from (meth)acrylates.

12. The antifouling coating composition according to claim 1, wherein the ethylenically unsaturated monomer(s) other than those of general formula (I) are selected from methyl (meth)acrylate (MA/MMA), methoxy ethyl (meth)acrylate (MOXEA/MOXEMA), butyl (meth)acrylate (BA/BMA), styrene, triisopropylsilyl(meth)acrylate (TiPS(M)A) and (meth)acrylic acid (AAc/MAAc).

13. The antifouling coating composition according to claim 1, wherein the polymer has a molar ratio of monomers of general formula (I) to other ethylenically unsaturated monomers of 20:80 to 80:20.

14. The antifouling coating composition according to claim 1, wherein the polymer is a copolymer of MMA and one of IPGA/IPGMA, iPGEOA/iPGEOMA and GCA/GCMA.

15. The antifouling coating composition according to claim 1, wherein the monomers of general formula (I) in total constitute 25-95% by weight of the polymer.

16. The antifouling coating composition according to claim 1, wherein the ethylenically unsaturated monomer(s) other than those of general formula I in total constitute 5-75% by weight of the polymer.

17. The antifouling coating composition according to claim 1, wherein the polymer constitutes 2-60% by solids volume of the coating composition.

18. The antifouling coating composition according to claim 1, wherein the coating composition further comprises as a co-binder a silylated acrylate co-polymer having at least one side chain bearing at least one terminal group of the general formula (A):

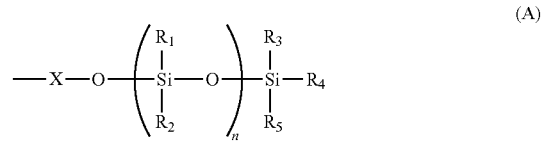

wherein n is an integer of 0-100, X is —C(=O)—, and $R_1$, $R_2$, $R_3$, $R_4$ and $R_5$ are each independently selected from $C_{1-20}$-alkyl and optionally substituted aryl, as a part of the binder system.

19. The antifouling coating composition according to claim 1, wherein the coating composition further comprises as a co-binder a non-aqueous dispersion binder component, wherein said binder component comprises a resin having a core-shell structure which is constituted of (a) a hydrophilic core component comprising a polymer of ethylenically unsaturated monomers, and (b) a shell component comprising a polymer of ethylenically unsaturated monomers.

20. An antifouling coat comprising an erodible binder system, wherein said binder system comprises a polymer of ethylenically unsaturated monomers, said monomers including at least one monomer of the general formula (I):

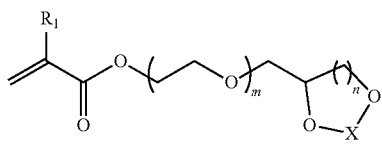
(I)

wherein m is 0-50, n is 1-3, $R_1$ is selected from hydrogen and methyl, and X is selected from $>C=O$ or $>C(R_2)(R_3)$, wherein $R_2$ and $R_3$ are independently selected from hydrogen, $C_{1-20}$-alkyl and aryl, wherein said erodible binder system comprises:
one or more further binder components; and
one or more pigments and fillers.

21. The antifouling coat according to claim 20, wherein the polymer constitutes 2-60% by solids volume of the coat and wherein the one or more pigments and fillers constitute 5-45% by solids volume of the coat.

22. A marine structure comprising on at least a part of the outer surface thereof an outermost antifouling coat, as defined in claim 20.

23. A method for improving the antifouling properties of a coating composition comprising an erodible binder system comprising the step of incorporating as a co-binder one or more polymer(s) of ethylenically unsaturated monomers into said coating composition, said monomers including at least one monomer of the general formula (I):

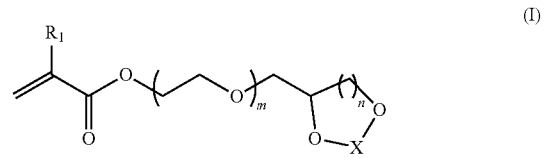
(I)

wherein m is 0-50, n is 1-3, $R_1$ is selected from hydrogen and methyl, and X is selected from $>C=O$ or $>C(R_2)(R_3)$, wherein $R_2$ and $R_3$ are independently selected from hydrogen, $C_{1-20}$-alkyl and aryl, and wherein said erodible binder system, comprises one or more further binder components.

24. An antifouling coating composition comprising a polymer of ethylenically unsaturated monomers and a rosin, wherein said monomers includes at least one monomer of the general formula (I):

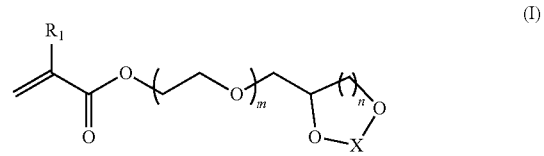
(I)

wherein m is 0-50, n is 1-3, $R_1$ is selected from hydrogen and methyl, and X is selected from $>C=O$ or $>C(R_2)(R_3)$, where $R_2$ and $R_3$ are independently selected from hydrogen, $C_{1-20}$-alkyl and aryl.

25. The antifouling coating composition according to claim 1, wherein the ethylenically unsaturated monomer(s) other than those of general formula I in total constitute 3-70% by weight of the polymer.

* * * * *